United States Patent
Sako

(10) Patent No.: US 11,763,383 B2
(45) Date of Patent: Sep. 19, 2023

(54) CRYPTOCURRENCY SYSTEM, TERMINAL, SERVER, TRADING METHOD OF CRYPTOCURRENCY, AND PROGRAM

(71) Applicant: NEC Corporation, Tokyo (JP)

(72) Inventor: Kazue Sako, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 17/610,191

(22) PCT Filed: May 30, 2019

(86) PCT No.: PCT/JP2019/021529
§ 371 (c)(1),
(2) Date: Nov. 10, 2021

(87) PCT Pub. No.: WO2020/240771
PCT Pub. Date: Dec. 3, 2020

(65) Prior Publication Data
US 2022/0253933 A1    Aug. 11, 2022

(51) Int. Cl.
*G06Q 40/04* (2012.01)
*G06Q 20/38* (2012.01)
*H04L 9/14* (2006.01)

(52) U.S. Cl.
CPC ......... *G06Q 40/04* (2013.01); *G06Q 20/3825* (2013.01); *H04L 9/14* (2013.01)

(58) Field of Classification Search
None
See application file for complete search history.

(56) References Cited

U.S. PATENT DOCUMENTS

| 2010/0217710 A1* | 8/2010 | Fujita | H04L 9/3263 705/30 |
| 2016/0260169 A1* | 9/2016 | Arnold | G06Q 20/381 |
| 2019/0165948 A1* | 5/2019 | Sako | H04L 9/3255 |

(Continued)

FOREIGN PATENT DOCUMENTS

| JP | 2008-257598 A | 10/2008 |
| JP | 2016-162431 A | 9/2016 |
| JP | 2016162431 | * 9/2016 | ............ G06Q 30/06 |

(Continued)

OTHER PUBLICATIONS

International Search Report for PCT Application No. PCT/JP2019/021529, dated Sep. 3, 2019.

(Continued)

*Primary Examiner* — Olabode Akintola
(74) *Attorney, Agent, or Firm* — Sughrue Mion, PLLC

(57) ABSTRACT

A cryptocurrency system that enables to verify the origin of a cryptocurrency is provided. A cryptocurrency system includes: at least one terminal; and a plurality of management servers configured to manage a blockchain storing a trading history in a cryptocurrency. The at least one terminal includes a trading control section, and a transmission section. The trading control section is configured to generate a transaction including a first signature for a trading content and a second signature enabling to verify a validity of a remittance source address described in the trading content. The transmission section is configured to transmit the generated transaction to the plurality of management servers.

19 Claims, 22 Drawing Sheets

(56) References Cited

U.S. PATENT DOCUMENTS

2019/0253260 A1* 8/2019 Uehara ................ H04L 9/3263

FOREIGN PATENT DOCUMENTS

| JP | 2018-507501 | A | 3/2018 | | |
|----|----|----|----|----|----|
| JP | 6340107 | * | 6/2018 | ............ | G06F 21/64 |
| JP | 6340107 | B1 | 6/2018 | | |
| JP | 6445211 | * | 12/2018 | ............ | G06Q 40/02 |
| JP | 6445211 | B1 | 12/2018 | | |
| JP | 2019-097148 | A | 6/2019 | | |
| WO | 2018/021535 | A1 | 2/2018 | | |

OTHER PUBLICATIONS

Written opinion for PCT Application No. PCT/JP2019/021529, dated Sep. 3, 2019.
Jan Camenisch. Jens Groth. Group Signatures, "Better Efficiency and New Theoretical Aspects" SCN 2004, vol. 3352 of LNCS, pp. 120-133, 2004.
Kazue Sako, Shoko Yonezawa, Jun Furukawa, "Anonymous Authentication Scheme for Pursuit of Security and Privacy", the Information Processing Society of Japan, vol. 47, No. 4, pp. 410-416, 2006.4.
English translation of Written opinion for PCT Application No. PCT/JP2019/021529, dated Sep. 3, 2019.

* cited by examiner

ACCOUNT MANAGEMENT INFORMATION

| ACCOUNT NUMBER | USER ID | NAME | USER PUBLIC KEY | | |
|---|---|---|---|---|---|
| A1 | B1 | C1 | PKu1 | | |
| A2 | B2 | C2 | PKu2 | | |
| A3 | B2 | C3 | PKu3 | | |
| ... | ... | ... | ... | | |

Fig.4

CRYPTOCURRENCY SYSTEM, TERMINAL, SERVER, TRADING METHOD OF CRYPTOCURRENCY, AND PROGRAM

This application is a National Stage Entry of PCT/JP2019/021529 filed on May 30, 2019, the contents of all of which are incorporated herein by reference, in their entirety.

BACKGROUND

Technical Field

The present invention relates to a cryptocurrency system, a terminal, a server, a trading method of a cryptocurrency, and a program.

Background Art

In recent years, cryptocurrencies such as Bitcoin have been widely used. Implementation of cryptocurrency is based upon information management using a blockchain. With the blockchain, a common ledger is managed among nodes participating in a peer to peer (P2P) network, in which anyone can participate without the need of a central management server.

General operation of a node (management node) performing management of the blockchain is as follows.

The management node receives a transaction issued from a transaction issuer, and performs verification of the received transaction. Subsequently, the management node summarizes the transaction that has passed the verification and generates a block. The management node transmits the generated block to another management node, and establishes an agreement related to the block to be added to the blockchain. The management node stores the block with which the agreement is established (block including a plurality of transactions) in the ledger.

The operation of the management node makes it difficult for a malicious node participating in the blockchain as a management node to manipulate data (transaction). In a cryptocurrency such as Bitcoin, a payment history is managed in a ledger held by management nodes, and a cryptocurrency system is implemented in the blockchain.

PTL 1 describes a system that enables to verify a validity of data and appropriately limits information obtained from the data. The system described in PTL 1 includes a plurality of nodes that transmit data to which a group signature is added and a plurality of management servers that are mutually directly connected.

PTL 2 discloses that financial trading is performed by using a computer network storing a distributed ledger.

PTL 3 describes that a remitting terminal adds a group signature to non-active electronic money to generate active electronic money.

NPL 1 discloses one method of group signatures, which is referred to as a Camenisch-Groth method. Further, NPL 2 describes an overview of the Camenisch-Groth method disclosed in NPL 1.

CITATION LIST

Patent Literature

[PTL 1] WO 2018/021535
[PTL 2] JP 2018-507501 A
[PTL 3] JP 2008-257598 A

Non Patent Literature

[NPL 1] Jan Camenisch. Jens Groth. Group Signatures, "Better Efficiency and New Theoretical Aspects" SCN 2004, vol. 3352 of LNCS, pp. 120-133, 2004
[NPL 2] Kazue Sako, Shoko Yonezawa, Jun Furukawa, "Anonymous Authentication Scheme for Pursuit of Security and Privacy", the Information Processing Society of Japan, Vol. 47, No. 4, pp. 410-416, 2006.4

SUMMARY

Technical Problem

In cryptocurrency such as Bitcoin, a public key of a currency owner or information based on the public key is in many cases used as an "account number". The public key can be freely created by anyone, and thus identity of an owner of the account can be concealed. Thus, there is concern that cryptocurrency such as Bitcoin may be used for the act of obfuscating the origin of funds (so-called, money laundering).

The present invention has a main example object to provide a cryptocurrency system, a terminal, a server, a trading method of a cryptocurrency, and a program that enable to verify the origin of a cryptocurrency.

Solution to Problem

According to a first example aspect of the present invention, there is provided a cryptocurrency system. The cryptocurrency system includes at least one terminal; and a plurality of management servers configured to manage a blockchain storing a trading history in a cryptocurrency. The at least one terminal includes: a trading control section configured to generate a transaction including a first signature for a trading content and a second signature enabling to verify a validity of a remittance source address described in the trading content, and a transmission section configured to transmit the generated transaction to the plurality of management servers.

According to a second example aspect of the present invention, there is provided a terminal. The terminal includes: a trading control section configured to generate a transaction including a first signature for a trading content in a cryptocurrency and a second signature enabling to verify a validity of a remittance source address described in the trading content; and a transmission section configured to transmit the generated transaction to a plurality of management servers configured to manage a blockchain storing a trading history in the cryptocurrency.

According to a third example aspect of the present invention, there is provided a server configured to provide a terminal configured to perform trading by using a cryptocurrency with information for generating a signature enabling to verify a validity of a remittance source address described in a trading content by the terminal.

According to a fourth example aspect of the present invention, there is provided a server configured to manage a blockchain storing a trading history in a cryptocurrency, receive a transaction including a first signature for a trading content and a second signature enabling to verify a validity of a remittance source address described in the trading content, and accept the received transaction when verification of the first and second signatures is successful.

According to a fifth example aspect of the present invention, there is provided a trading method of a cryptocurrency. The trading method includes: generating a transaction including a first signature for a trading content in the cryptocurrency and a second signature enabling to verify a validity of a remittance source address described in the trading content; and transmitting the generated transaction to a plurality of management servers configured to manage a blockchain storing a trading history in the crypto currency.

According to a sixth example aspect of the present invention, there is provided a program causing a computer installed in a terminal to execute: processing of generating a transaction including a first signature for a trading content in a cryptocurrency and a second signature enabling to verify a validity of a remittance source address described in the trading content; and processing of transmitting the generated transaction to a plurality of management servers configured to manage a blockchain storing a trading history in the cryptocurrency.

Advantageous Effects of Invention

According to each perspective of the present invention, a cryptocurrency system, a terminal, a server, a trading method of a cryptocurrency, and a program that enable to verify the origin of a cryptocurrency are provided. Note that, according to the present invention, instead of or together with the above effects, other effects may be exerted.

BRIEF DESCRIPTION OF THE DRAWINGS

FIG. 4 is a diagram illustrating an example of account management information generated by an account management section;

DESCRIPTION OF THE EXAMPLE EMBODIMENTS

Figure 1:
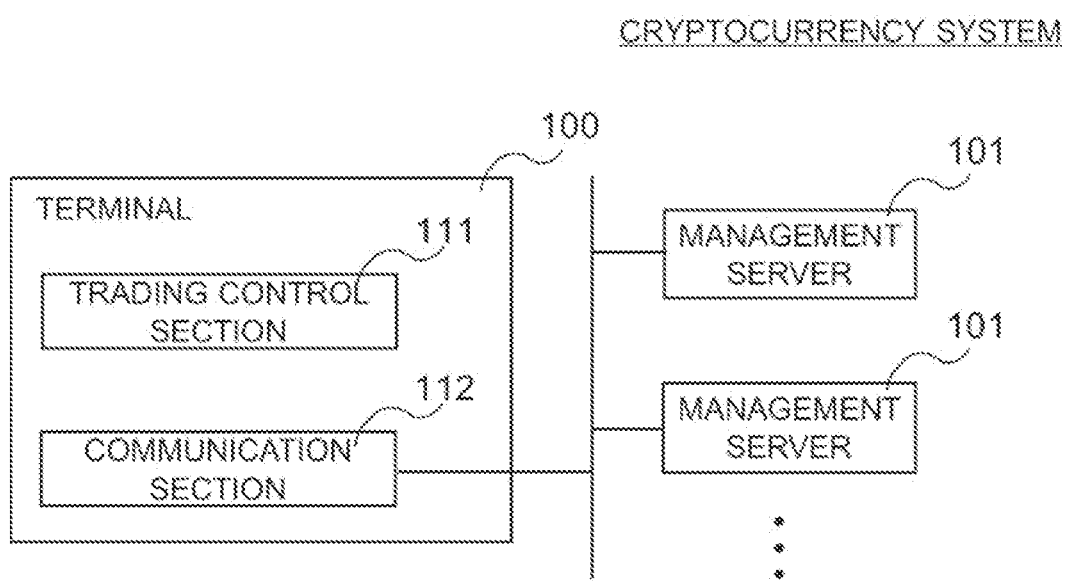
FIG. 1 is a diagram for illustrating an overview of an example embodiment.

First of all, an overview of an example embodiment will be described. Note that reference signs in the drawings added in the overview are added to respective elements for the sake of convenience as an example to promote better understanding, and the description of the overview is to by no means set any limitations. Note that, in the Specification and drawings, elements to which similar descriptions are applicable are denoted by the same reference signs, and overlapping descriptions may hence be omitted.

A cryptocurrency system according to an example embodiment includes at least one terminal 100, and a plurality of management servers 101 that manage a blockchain storing a trading history in a cryptocurrency (see FIG. 1). The at least one terminal 100 includes a trading control section 111 and a transmission section 112. The trading control section 111 generates a transaction including a first signature for a trading content, and a second signature enabling to verify a validity of a remittance source address described in the trading content. The transmission section 112 transmits the generated transaction to the plurality of management servers 101.

The terminal 100 adds two signatures to the transaction. The first signature is a signature for proving that the transaction (trading content) is generated by the terminal 100. The second signature is a signature for proving that the remittance source address described in the transaction is valid. For example, as will be described later, an authorized institution that has authority to open an account of the cryptocurrency system and that verifies identity of a user who desires to open an account adds a signature to the remittance source address. The signature is added to the transaction. By verifying the added signatures, the management server 101 can confirm whether the remittance source address is a remittance source address of an authorized user whose identity verification has completed or a remittance source address of a user whose identity verification has not finished. In other words, whether the origin of the cryptocurrency is valid or invalid can be verified.

Specific example embodiments will be described below in further detail with reference to the drawings.

First Example Embodiment

A first example embodiment will be described in further detail with reference to the drawings.

System Configuration

Figure 2:
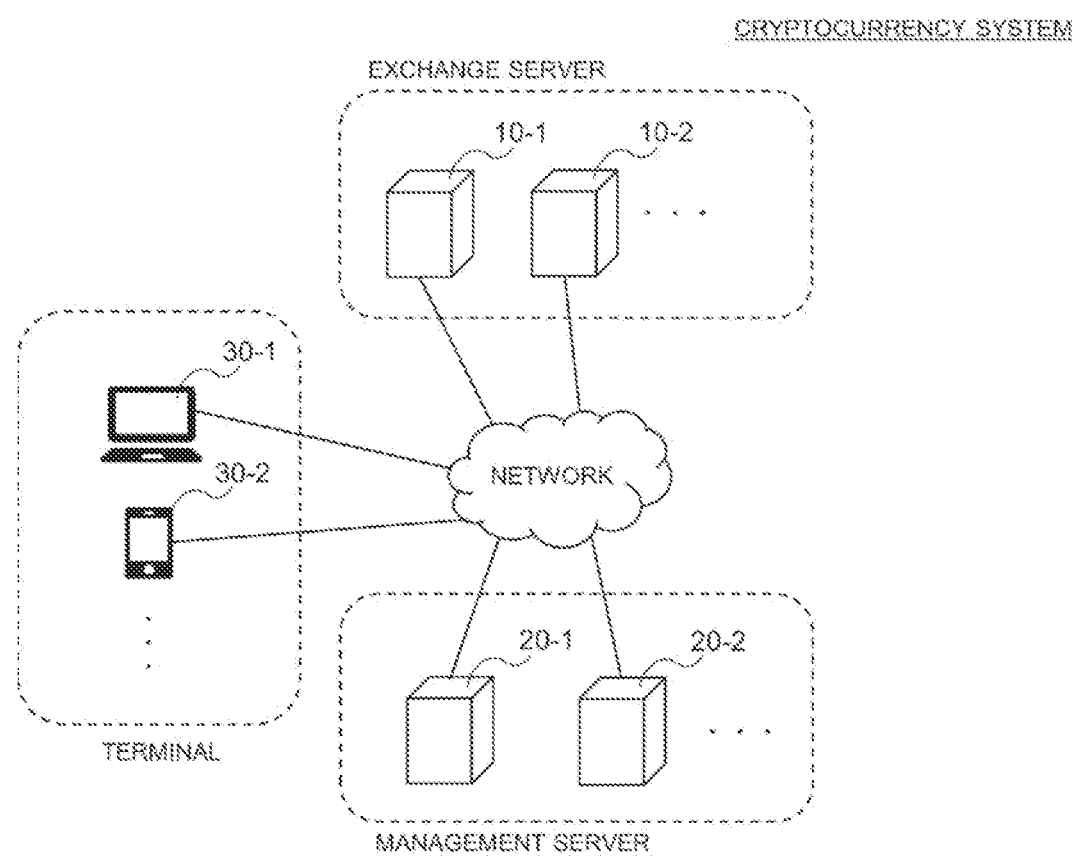
FIG. 2 is a diagram illustrating an example of a schematic configuration of a cryptocurrency system according to a first example embodiment.

FIG. 2 is a diagram illustrating an example of a schematic configuration of a cryptocurrency system according to the first example embodiment. With reference to FIG. 2, the cryptocurrency system includes at least one exchange server 10, at least one management server 20, and at least one terminal 30.

In the following description, when a plurality of apparatuses need to be distinguished from each other, numbers added after a hyphen (-) are used. For example, when two exchange servers 10 illustrated in FIG. 2 are distinguished from each other, the two exchange servers 10 are described as exchange servers 10-1 and 10-2.

The exchange server 10, the management server 20, and the terminal 30 are configured to be capable of communicating with each other via a network.

The exchange server 10 is a server operated by a cryptocurrency exchange approved by the Financial Services Agency. The exchange server 10 performs management of users participating in the cryptocurrency system (transactors of the cryptocurrency) and the like. More specifically, the exchange server 10 opens an account of a user who desires to use the cryptocurrency in the cryptocurrency system. Note that, in the disclosure of the present application, the "Financial Services Agency" refers to an official institution that provides financial supervision of each nation and that has authority to conduct investigation related to financial crimes and the like as necessary.

The exchange server 10 performs identity verification (know your customer (KYC)) of a user when opening a new account. After it is confirmed that there is no problem in opening an account through identity verification, the exchange server 10 performs a procedure for the user to perform trading in the cryptocurrency system.

The management server 20 is a server that manages trading on the cryptocurrency system. The management server 20 manages a blockchain that stores a trading history (history of transactions) in the cryptocurrency. The management server 20 corresponds to a management node described above.

The management servers 20 include a common ledger, and manage a history related to trading between users on the blockchain. Note that the management node (management server) constituting the blockchain used for the cryptocurrency such as Bitcoin is also referred to as a "miner" that earns a reward when generating a block. Note that the management server 20 according to the disclosure of the present application need not have a function as the miner (mining function).

The terminal 30 is a terminal used by the user participating in the cryptocurrency system. Examples of the terminal 30 include mobile terminal apparatuses such as a smartphone, a mobile phone, a gaming machine, and a tablet, a computer (a personal computer, a laptop personal computer), and the like.

Outline of Operation

General operation of the cryptocurrency system will be described.

The user who desires to participate in the cryptocurrency system operates the terminal 30 to perform a request of "account opening" to the exchange server 10. In this case, the terminal 30 generates a public key (hereinafter referred to as a user public key) being the base of the "account" at time of trading.

The terminal 30 provides information (hereinafter referred to as user information) for verifying identity of the user and the user public key to the exchange server 10. Examples of the user information include image data capturing a passport, a certificate of residence, and the like. The terminal 30 transmits the "account opening request" including the user information and the user public key to the exchange server 10 in which the account is to be opened. Note that the disclosure of the present application presupposes a case in which the terminal 30 includes the user information in the account opening request and transmits the account opening request to the exchange server 10; however, the user may provide the user information described in a document to the exchange via mail or the like.

The exchange that has received the account opening request performs identity verification of the user by using the acquired user information. When there is no problem in the identity verification, the exchange server 10 adds a signature to the user public key acquired from the user. Specifically, the exchange server 10 generates a signature for the user public key by using a private key generated in advance.

The exchange server 10 transmits the generated signature (signature for the user public key) to the terminal 30.

The terminal 30 sets a remittance source address of a trading using the cryptocurrency, based on the user public key. The terminal 30 adds a signature (first signature described above) to the content of the trading by using a private key (hereinafter referred to as a user private key) to be paired with the user public key. The terminal 30 adds the acquired signature (signature of the exchange server 10 for the user public key) to the transaction when performing the trading.

The terminal 30 transmits (broadcasts) the transaction describing the content of the trading to a peer to peer network consisting of a plurality of management servers 20. In this case, the terminal 30 transmits the transaction including the signature with the user private key and the signature acquired from the exchange server 10 (signature of the exchange server 10 for the user public key).

After the management server 20 acquires the transaction from the terminal 30, the management server 20 verifies the two signatures. The management server 20 stores, in the blockchain (ledger), only the transaction that has succeeded in verification of the two signatures.

When verification of the transaction and storing in the blockchain by the management server 20 are completed, the trading between users is completed.

As described above, the remittance source address described in the transaction is set based on the user public key. Thus, the signature of the exchange server 10 functions as a signature (second signature described above) enabling to verify a validity of the remittance source address described in the trading content. When the signature generated by the authorized exchange server 10 is not added to the transaction, it is determined that the remittance source address described in the transaction is not a valid address but is an invalid address generated for the purpose of money laundering or the like.

Next, each apparatus constituting the cryptocurrency system will be described.

[Exchange Server]

Figure 3:
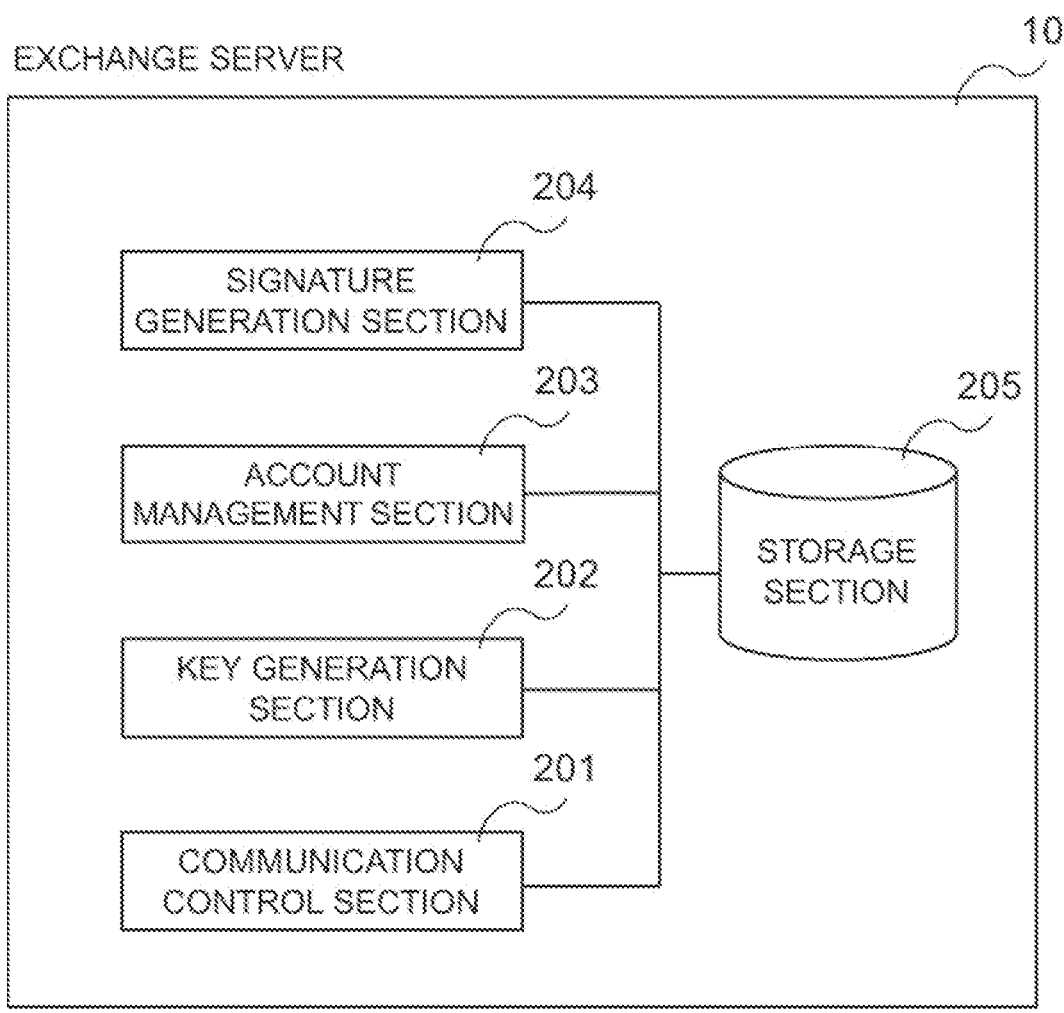
FIG. 3 is a diagram illustrating an example of a processing configuration of an exchange server according to the first example embodiment.

FIG. 3 is a diagram illustrating an example of a processing configuration (processing module) of the exchange server 10 according to the first example embodiment. With reference to FIG. 3, the exchange server 10 includes a communication control section 201, a key generation section 202, an account management section 203, a signature generation section 204, and a storage section 205.

The communication control section 201 is a means that implements communication with another apparatus. The communication control section 201 is also a means that distributes a message (packets) received from another apparatus to each processing module, or that transmits a message acquired from each processing module to another apparatus.

The key generation section 202 is a means that generates a key used at the time of adding a signature to the user public key acquired from the terminal 30 in a case of opening an account. The key generation section 202 generates a pair of a public key and a private key. The generated public key is released to the public, and the private key is stored in the storage section 205.

The account management section 203 is a means that processes the account opening request from the user (terminal 30). As described above, the account opening request includes at least the user information (for example, a copy of a passport) and the user public key.

The account management section 203 provides an operator with a graphical user interface (GUI) for performing identity verification of the user. For example, the account management section 203 displays the user information in a liquid crystal display or the like.

The operator screens the displayed user information, and inputs results of the screening (account opening permitted, account opening not-permitted) to the exchange server 10.

When the screening results are "account opening not-permitted", the account management section 203 returns the screening results to the terminal 30 that has transmitted the account opening request.

When the screening results are "account opening permitted", the account management section 203 delivers the user public key included in the account opening request to the signature generation section 204, and instructs the signature generation section 204 to generate a signature.

The signature generation section 204 generates a signature using the private key for the user public key to be a target of the signature. The signature generation section 204 delivers the user public key and the generated signature to the account management section 203. Note that the signature generation performed by the signature generation section 204 is essentially the same as issuing a "certificate" (public key certificate) of the exchange server 10 to the user public key.

The account management section 203 notifies the terminal 30 that the screening results are "account opening permitted", and transmits the signature for the user public key to the terminal 30.

When an account is opened in accordance with the account opening request, the account management section 203 generates information (hereinafter referred to as account management information) indicating details of the opened account, and stores the information in the storage section 205.

For example, the account management section 203 generates the account management information as illustrated in FIG. 4. With reference to FIG. 4, an account number, a user identifier (ID), a name, and a user public key are stored in association with each other. Alternatively, in the account management information, a name is not included, and personal information such as a user ID, a name, an address, and gender may be separately stored in association with each other.

The account management section 203 notifies the Financial Services Agency or the like of all or a part of the generated account management information as necessary. For example, the account management section 203 notifies the Financial Services Agency or the like of the user public key of the user who has opened the account.

The storage section 205 stores information necessary for the exchange server 10 to operate, such as the private key.

[Terminal]

Figure 5:
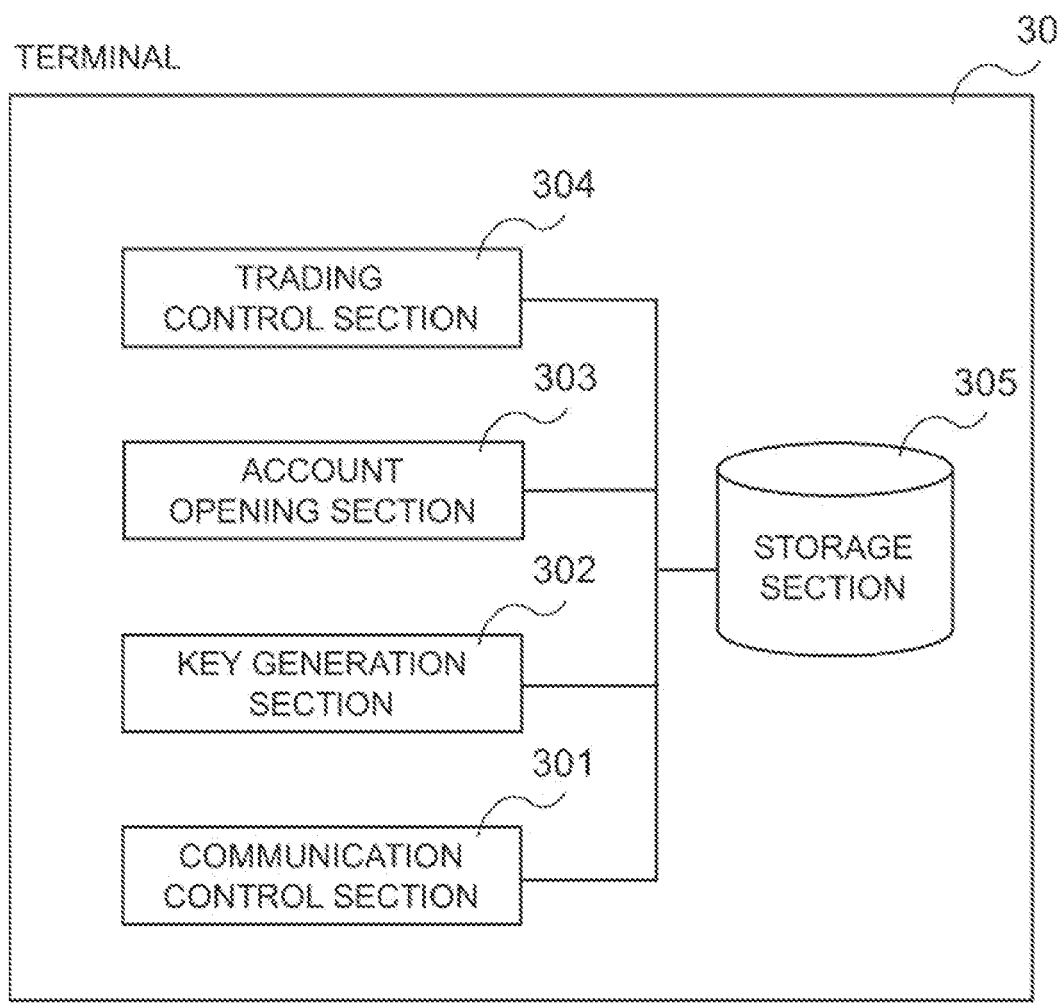
FIG. 5 is a diagram illustrating an example of a processing configuration of a terminal according to the first example embodiment.

FIG. 5 is a diagram illustrating an example of a processing configuration (processing module) of the terminal 30 according to the first example embodiment. With reference to FIG. 5, the terminal 30 includes a communication control section 301, a key generation section 302, an account opening section 303, a trading control section 304, and a storage section 305.

The communication control section 301 is a means that implements communication with another apparatus. The communication control section 301 is also a means that distributes a message (packets) received from another apparatus to respective processing modules, or that transmits a message acquired from each processing module to another apparatus. The communication control section 301 includes the function of the transmission section 112 described above.

The key generation section 302 is a means that generates a user public key being the base of an account (account number; address used for trading) in the cryptocurrency system. The key generation section 302 generates the user public key and a private key to be paired with the user public key. The generated user public key is released to the public, and the user private key is stored in the storage section 305.

The account opening section 303 is a means that executes processing related to account opening in response to a command from a user. The account opening section 303 provides the user with a GUI for inputting information related to account opening. Specifically, the account opening section 303 performs display for inputting information such as a name and an address, user information for identity verification, and information related to the exchange in which the account is opened (for example, address information of the exchange server 10).

The account opening section 303 transmits the "account opening request" including the user information and the user public key generated by the key generation section 302 to the exchange server 10 selected by the user. The account opening section 303 stores the "signature of the exchange server 10 for the user public key" included in response to the account opening request in the storage section 305.

The trading control section 304 is a means that controls and manages trading using the cryptocurrency. The trading control section 304 generates the transaction describing details of trading (details of remittance), and transmits the generated transaction to each of the plurality of management servers 20.

In this case, the trading control section 304 adds two signatures to the transaction.

The first signature is a signature of the own apparatus (terminal 30). The trading control section 304 generates the signature for the trading content by using the user private key.

The second signature is a signature (signature for the user public key) acquired from the exchange server 10. Note that the terminal 30 may include an address generated from the user public key in the account opening request and transmit the account opening request to the exchange server 10. In this case, the exchange server 10 may add a signature to the address generated from the user public key. In other words, the second signature may be a signature of the exchange server 10 for the address generated from the user public key. Note that whether a signature is added to the user public key or a signature is added to the address may be determined according to a calculation amount required in signature generation or the like.

Figure 6:
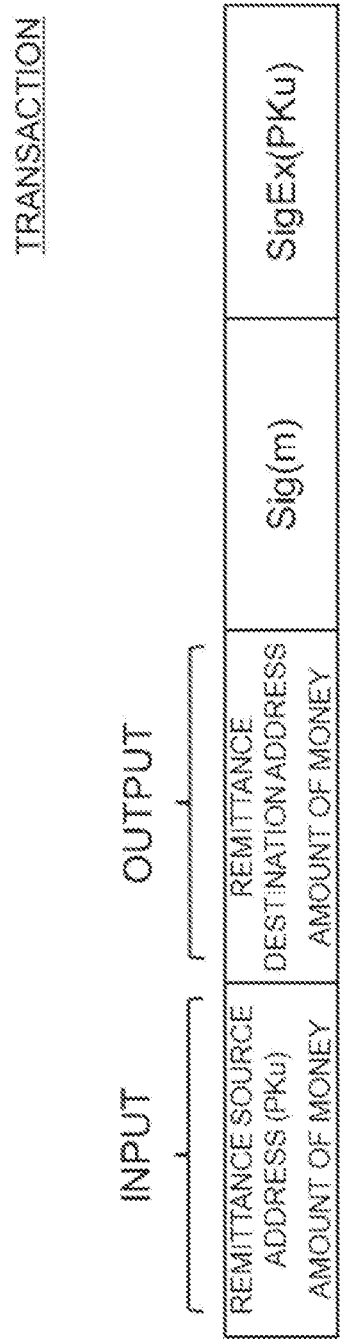
FIG. 6 is a diagram illustrating an example of a transaction generated by a trading control section.

For example, the trading control section 304 generates a transaction as illustrated in FIG. 6.

As illustrated in FIG. 6, the trading control section 304 generates a transaction including a trading content (input, output) m, a signature Sig (m) for the trading content m, and a signature SigEx (PKu) of the exchange server 10 for the user public key PKu.

The user public key PKu of the own apparatus (terminal 30) is set to the remittance source address included in the trading content, and the public key of the remittance destination is set to the remittance destination address. Alternatively, information (for example, a hash value of the user public key) generated from the user public key PKu may be set to the remittance source address, and information generated from the public key of the remittance destination may be set to the remittance destination address.

Note that the trading control section 304 acquires the remittance destination address (public key of the destination) from the destination (remittance destination).

The trading control section 304 generates the signature Sig (m) by using the user private key SKu for the trading content. The signature SigEx (PKu) of the exchange server 10 for the user public key PKu is a signature acquired from the exchange server 10.

The storage section 305 stores information necessary for the terminal 30 to operate, such as the user private key.

[Management Server]

Figure 7:
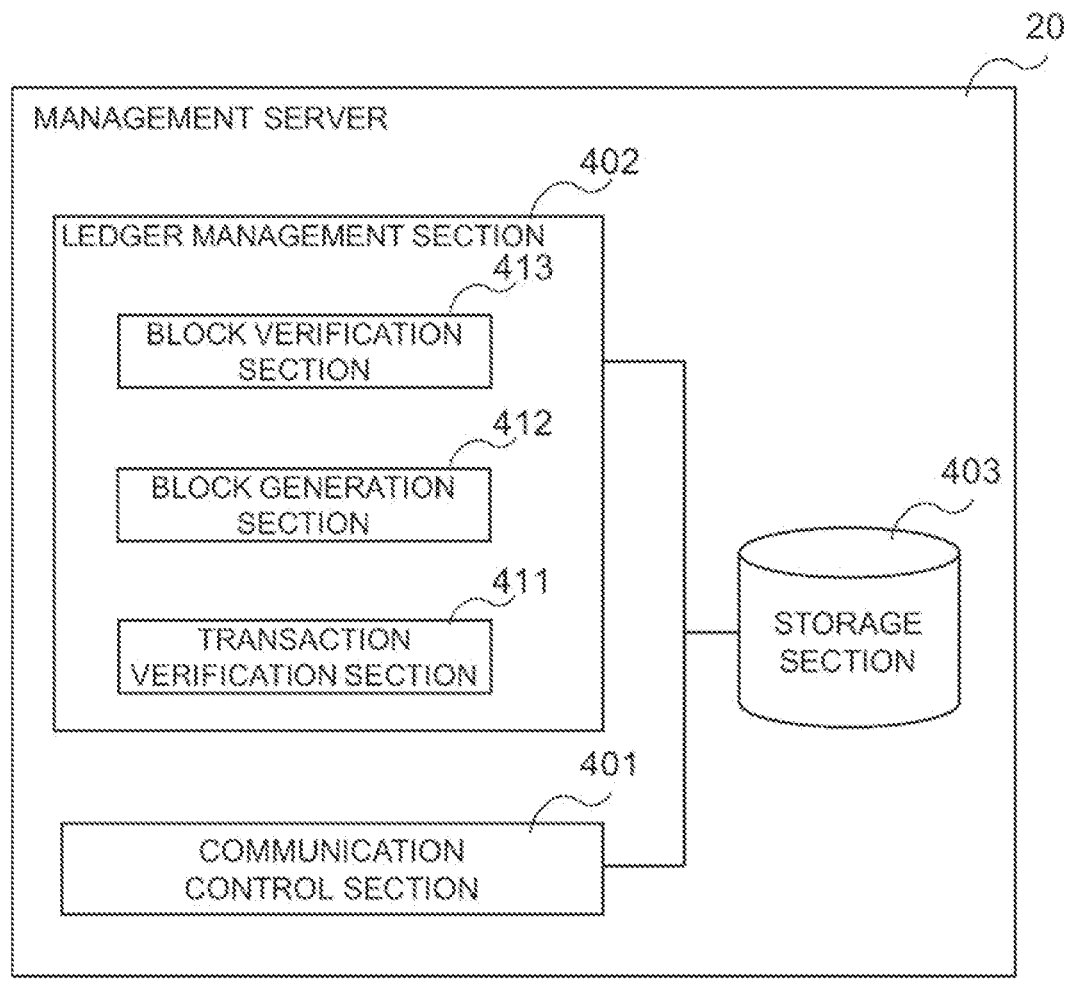
FIG. 7 is a diagram illustrating an example of a processing configuration of a management server according to the first example embodiment.

FIG. 7 is a diagram illustrating an example of a processing configuration (processing module) of the management server 20 according to the first example embodiment. With reference to FIG. 7, the management server 20 includes a communication control section 401, a ledger management section 402, and a storage section 403.

The communication control section 401 is a means that implements communication with another apparatus. The communication control section 401 is also a means that distributes a message (packets) received from another apparatus to respective processing modules, or that transmits a message acquired from each processing module to another apparatus.

The ledger management section 402 is a means that processes an access request for the blockchain. For example, when the ledger management section 402 receives a transaction from the terminal 30, the ledger management section 402 additionally writes the transaction in a data management ledger stored in the storage section 403.

When the ledger management section 402 receives a reading request of the transaction described in the blockchain from the outside, the ledger management section 402 searches the data management ledger by using an identifier accompanying the request (identifier for identifying the transaction) as a key. The ledger management section 402 extracts the transaction to which the identifier is assigned.

The ledger management section 402 returns the extracted transaction to an external apparatus that has transmitted the reading request.

The storage section 403 is a means that stores information necessary for processing of each processing module. The storage section 403 includes a temporary storage area that temporarily stores data, and an area that stores the data management ledger.

The ledger management section 402 includes three sub-modules, namely a transaction verification section 411, a block generation section 412, and a block verification section 413.

When the ledger management section 402 acquires the transaction, the ledger management section 402 stores the acquired transaction in the temporary storage area of the storage section 403.

The transaction verification section 411 verifies whether or not the acquired transaction is an authorized transaction generated by the user who has an account in the exchange. Specifically, the transaction verification section 411 verifies two signatures included in the transaction, and when verification of both of the two signatures is successful, the transaction verification section 411 accepts the transaction.

Specifically, the transaction verification section 411 verifies the signature Sig (m) provided for the transaction by using the user public key released to the public from the terminal 30. Similarly, the transaction verification section 411 verifies the signature SigEx (PKu) of the exchange server 10 for the user public key provided for the transaction by using the public key of the exchange server 10.

When verification of at least any one of the two signatures fails, the transaction verification section 411 discards the acquired transaction.

When verification of both of the two signatures succeeds, the transaction verification section 411 accepts the acquired transaction, and notifies the block generation section 412 of the situation.

The block generation section 412 shares the data management ledger with other management servers 20, and generates a block for management. The block generation section 412 generates "validity guarantee data" from a header of a block generated immediately before and the transaction stored in the temporary storage area of the storage section 403.

For example, when the block generation section 412 calculates additionally written data, a header of a previous block, and a hash value of validity guarantee data, the block generation section 412 generates a value (so-called, a nonce value) for causing the calculated hash value to comply with a predetermined rule as the validity guarantee data.

The block generation section 412 generates a block including the header of the block generated immediately before and the header consisting of the validity guarantee data.

When block generation performed by the block generation section 412 ends, the block is additionally written in the data management ledger. The block generation section 412 distributes (transmits) the generated block to another management server 20 via the communication control section 401.

The communication control section 401 of the management server 20 that has received the block from another management server 20 delivers the acquired block to the block verification section 413.

The block verification section 413 is a means that verifies validity of the block transmitted by another management server 20, based on the data management ledger (blocks) stored in the storage section 403 of the own apparatus. Specifically, the block verification section 413 verifies validity of the received block by using the headers of the block generated by the management server 20 that has transmitted the block and the headers of the block generated immediately before managed by the own apparatus (management server 20 that has received the block).

First of all, the block verification section 413 identifies the "header of a previous block" described in the received block, based on the data management ledger managed by the block verification section 413.

Subsequently, by using the additionally written data in the received block and the header of the previous block as input, the block verification section 413 confirms whether or not there is consistency in the validity guarantee data in the header (whether or not the validity guarantee data complies with the predetermined rule).

When the block verification section 413 successfully confirms consistency of the validity guarantee data, the block verification section 413 determines that the block transmitted by another management server 20 is valid. In contrast, when the block verification section 413 fails to confirm consistency of the validity guarantee data, the block verification section 413 determines that the block transmitted by another management server 20 is invalid.

When the block verification section 413 determines that the block transmitted by another management server 20 is valid, the ledger management section 402 updates the data management ledger of the storage section 403 (additionally writes the block including additionally written data). In other words, the block verification section 413 performs processing of reflecting additional writing of data in the ledger of another management server 20 in the ledger of the own apparatus. When the block verification section 413 determines that the block transmitted by another management server 20 is invalid, the block verification section 413 discards the block.

The block verification section 413 notifies the management server 20 that has transmitted the block of information related to verification results (the received block is valid or invalid).

[Operation of System]

Next, operation of the cryptocurrency system according to the first example embodiment will be described.

Figure 8:
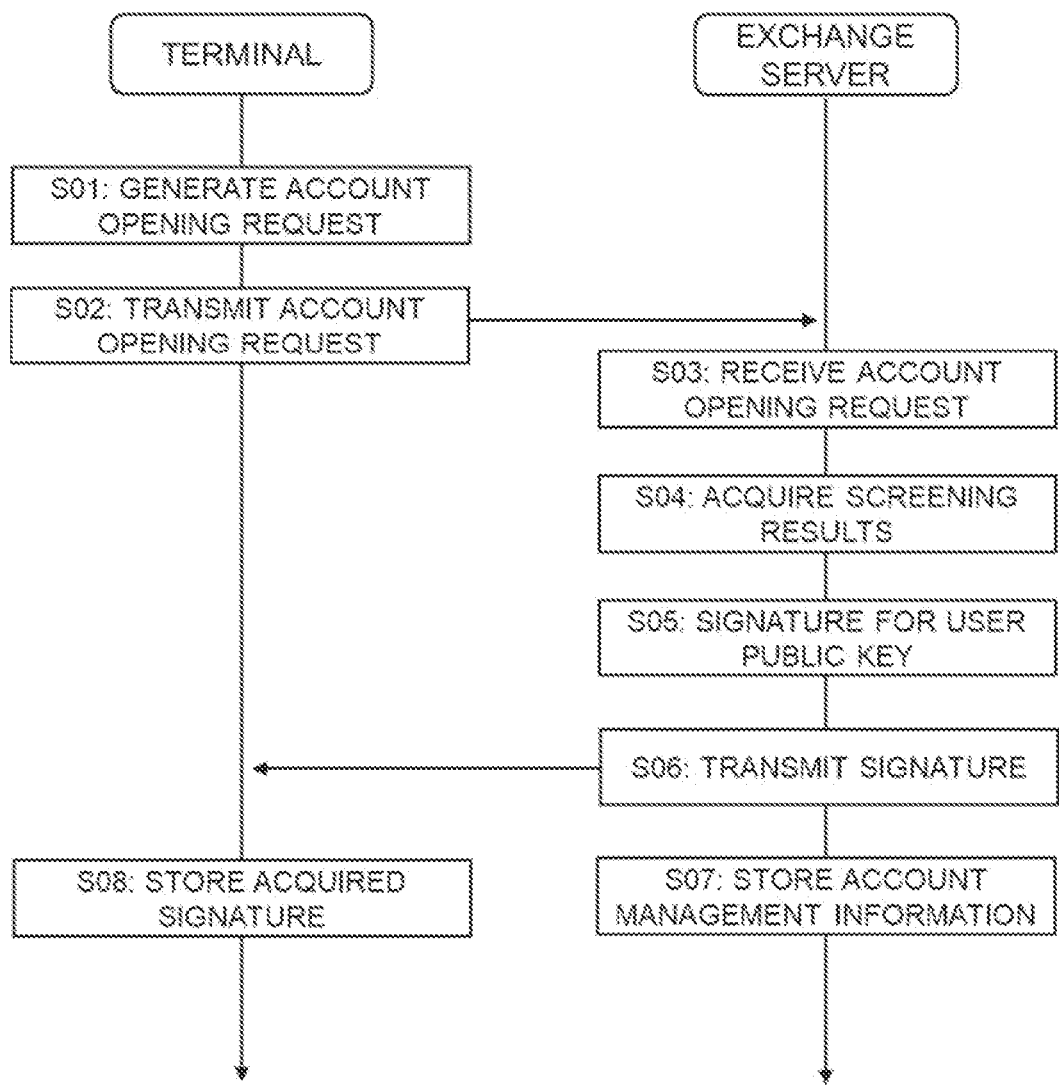
FIG. 8 is a sequence diagram illustrating an example of operation related to account opening in the cryptocurrency system according to the first example embodiment.

FIG. 8 is a sequence diagram illustrating an example of operation related to account opening in the cryptocurrency system according to the first example embodiment.

When the terminal 30 receives operation related to account opening from a user, the terminal 30 generates an account opening request (Step S01), and transmits the account opening request to the exchange server 10 specified from the user (Step S02).

The exchange server 10 receives the account opening request (Step S03).

The exchange server 10 presents user information included in the account opening request to an operator, and acquires screening results from the operator (Step S04).

When the screening results are "account opening permitted", the exchange server 10 adds a signature to a "user public key" included in the account opening request (Step S05).

The exchange server 10 transmits the signature for the user public key to the terminal 30 (Step S06).

The exchange server 10 generates account management information being information in which information (for example, a name and the like) related to identify of the user and the user public key are associated with each other, and stores the account management information in the storage section 205 (Step S07).

The terminal 30 stores the signature of the exchange server 10 for the user public key acquired from the exchange server 10 in the storage section 305 (Step S08).

After the processing described above, processing related to account opening ends.

Figure 9:
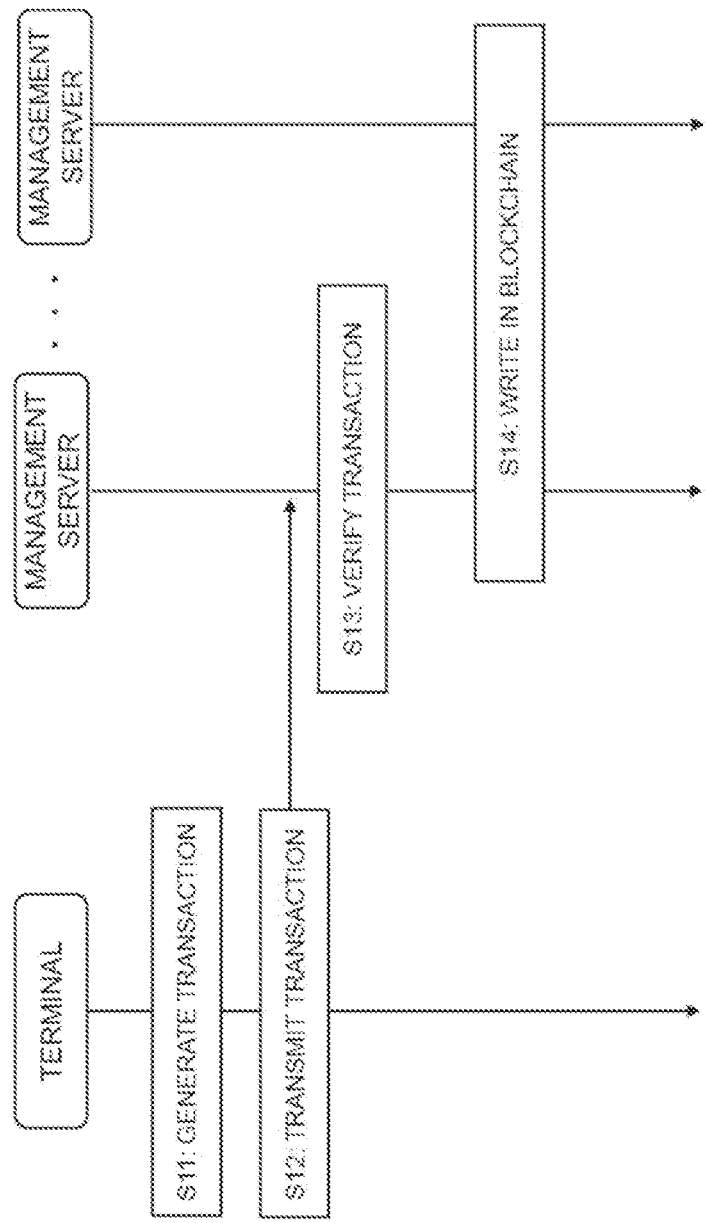
FIG. 9 is a sequence diagram illustrating an example of operation related to remittance processing in the cryptocurrency system according to the first example embodiment.

FIG. 9 is a sequence diagram illustrating an example of operation related to remittance processing in the cryptocurrency system according to the first example embodiment.

The terminal 30 generates a transaction including a content of a trading (Step S11). In this case, the terminal 30 generates a transaction including its own signature (signature using the user private key) for the trading content and the signature for the user public key acquired from the exchange server 10.

The terminal 30 transmits the generated transaction to the management server 20 (Step S12).

The management server 20 performs verification of the received transaction (Step S13). Specifically, the management server 20 verifies the two signatures included in at least the transaction, and verifies validity thereof. In the present step, the management server 20 may perform verification of the content of the transaction (trading content) as well. Specifically, the management server 20 may verify that the balance of the remittance source is more than the remittance amount.

When the two signatures are valid and the trading content is also appropriate, the management server 20 determines that the acquired transaction is an authorized transaction, and writes the acquired transaction in the blockchain (Step S14).

As described above, in the first example embodiment, the exchange (exchange server 10) that creates the account of the user participating in the cryptocurrency system adds a signature to the user public key to be used for the trading of the cryptocurrency. With the user adding the signature to the transaction, it is guaranteed that the transaction is a transaction generated by an authorized user whose identity is verified by the exchange. In other words, using the signature added to the transaction, the management server 20 can verify whether or not the remittance source address described in the trading content is an address of the account opened by an authorized exchange. In other words, the signature of the exchange server 10 for the user public key is a signature enabling to verify a validity of the remittance source address described in the trading content.

Note that the management server 20 that manages the blockchain handles a transaction to which the signature (signature of the exchange server 10 for the user public key) is not added as an unauthorized transaction, and discards the transaction. Thus, the unauthorized transaction is not to be described in the blockchain, and only the transaction of the user whose identity verification is performed by the exchange is to be described in the blockchain.

Thus, when transactions on the blockchain are investigated under suspicion of a crime such as money laundering, the user can be identified from the user public key of the user (terminal 30) who has generated the transaction. Specifically, by referring to the account management information generated by the exchange server 10 as illustrated in FIG. 4, the origin (user) of the cryptocurrency suspected of money laundering can be identified.

Note that it can be assumed that a crime group issues a signature pretending the authorized exchange server 10. In order to prevent such fraud, the management server 20 may acquire a public key used for verification of the signature from the Financial Services Agency or the like. As a result, an unauthorized transaction can be prevented from being handled as an authorized transaction.

Second Example Embodiment

Next, a second example embodiment will be described in detail with reference to the drawings.

Figure 10:
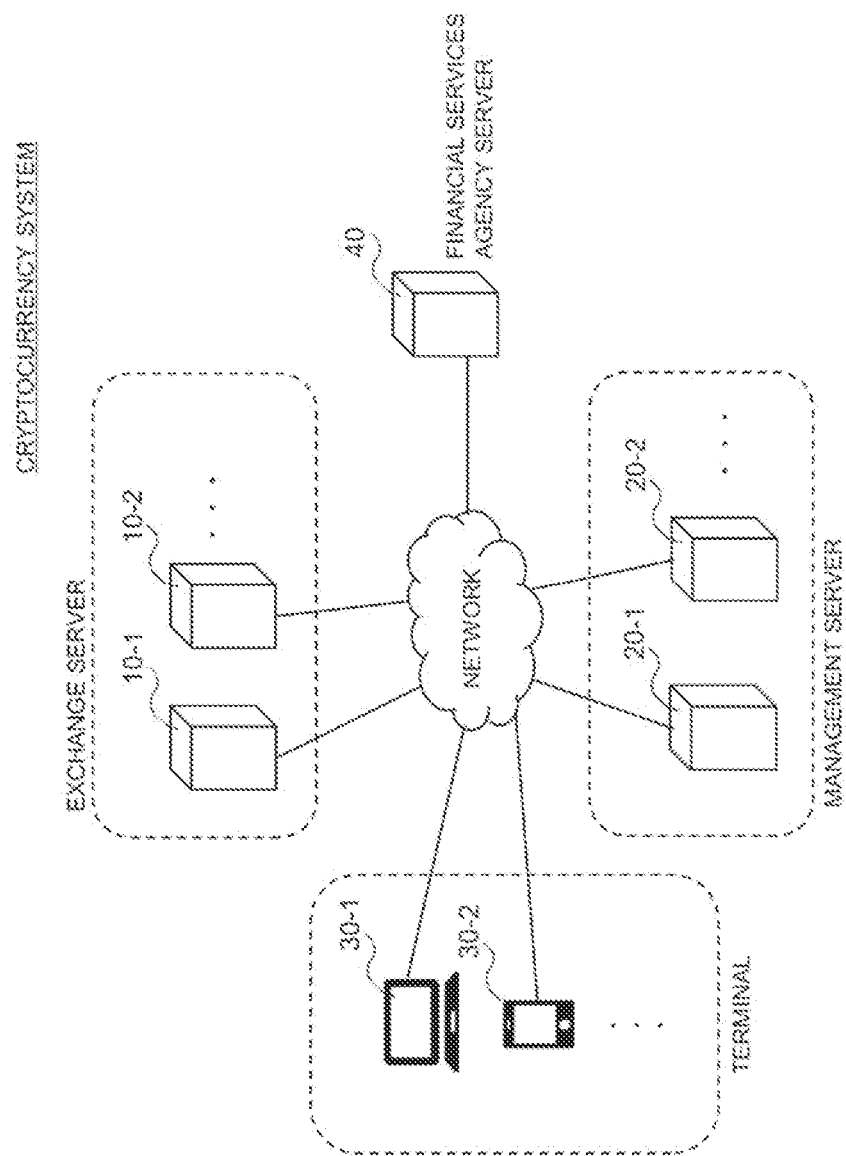
FIG. 10 is a diagram illustrating an example of a schematic configuration of a cryptocurrency system according to a second example embodiment.

FIG. 10 is a diagram illustrating an example of a schematic configuration of a cryptocurrency system according to the second example embodiment. With reference to FIG. 10, a Financial Services Agency server 40 is added to the cryptocurrency system described in the first example embodiment.

Basic roles and the like of the exchange servers 10, the management servers 20, and the terminals 30 can be the same as the details described in the first example embodiment, and description related to these apparatuses will thus be omitted.

In the first example embodiment, when the exchange (exchange server 10) that performs account management of a user participating in the cryptocurrency system verifies identity of the user, the exchange gives a signature for the user public key of the user to the user. With the signature for the user public key being added to a transaction, it can be confirmed that the transaction is a transaction generated by an authorized user whose identity is verified by the exchange.

However, such a configuration of the first example embodiment also has an aspect that privacy protection of the user using the cryptocurrency is insufficient. Specifically, the transaction described in the blockchain can be acquired by anyone, and the exchange server 10 can deduce the remittance source with the use of the user public key described in the transaction. For example, when the exchange server 10 acquires the user public key (remittance source address) from the transaction and searches the account management information as illustrated in FIG. 4, the exchange server 10 can deduce identity of the user corresponding to the acquired user public key. Because the user needs to use the address to which a signature is added by the exchange server 10, the number of available addresses is limited. As a result, there is a disadvantage that the person in question may be easily identified from the address.

As described above, the cryptocurrency system according to the first example embodiment also has an aspect of insufficiency regarding privacy protection of a user. In the second example embodiment, being able to enhance the privacy protection using a "group signature" will be described.

[General Operation]

An outline of operation of the cryptocurrency system according to the second example embodiment will be described with reference to FIG. 11.

The Financial Services Agency server 40 generates a key pair of a privileged-entity public key and a privileged-entity private key necessary for generation of a group signature. The Financial Services Agency server 40 releases the generated privileged-entity public key to the public.

The exchange server 10 generates a key pair of a manager public key and a manager private key necessary for generation of a group signature. The exchange server 10 releases the generated manager public key to the public.

The user (terminal 30) opens an account in the exchange for participating in the cryptocurrency system. In this case, the exchange server 10 acquires a user public key from the terminal 30, and generates a "member certificate" related to the user who opens the account using the user public key. More specifically, the exchange server 10 generates the member certificate in cooperation with the terminal 30 after verifying identity of the user.

Note that the member certificate is such data that a plurality of users who have opened their accounts in the exchange server 10 are handled as a group, which is used to prove that a user is a member of the group. When opening of an account completes, the terminal 30 acquires the member certificate.

The terminal 30 generates a key pair of at least one account public key and an account private key.

Figure 11:
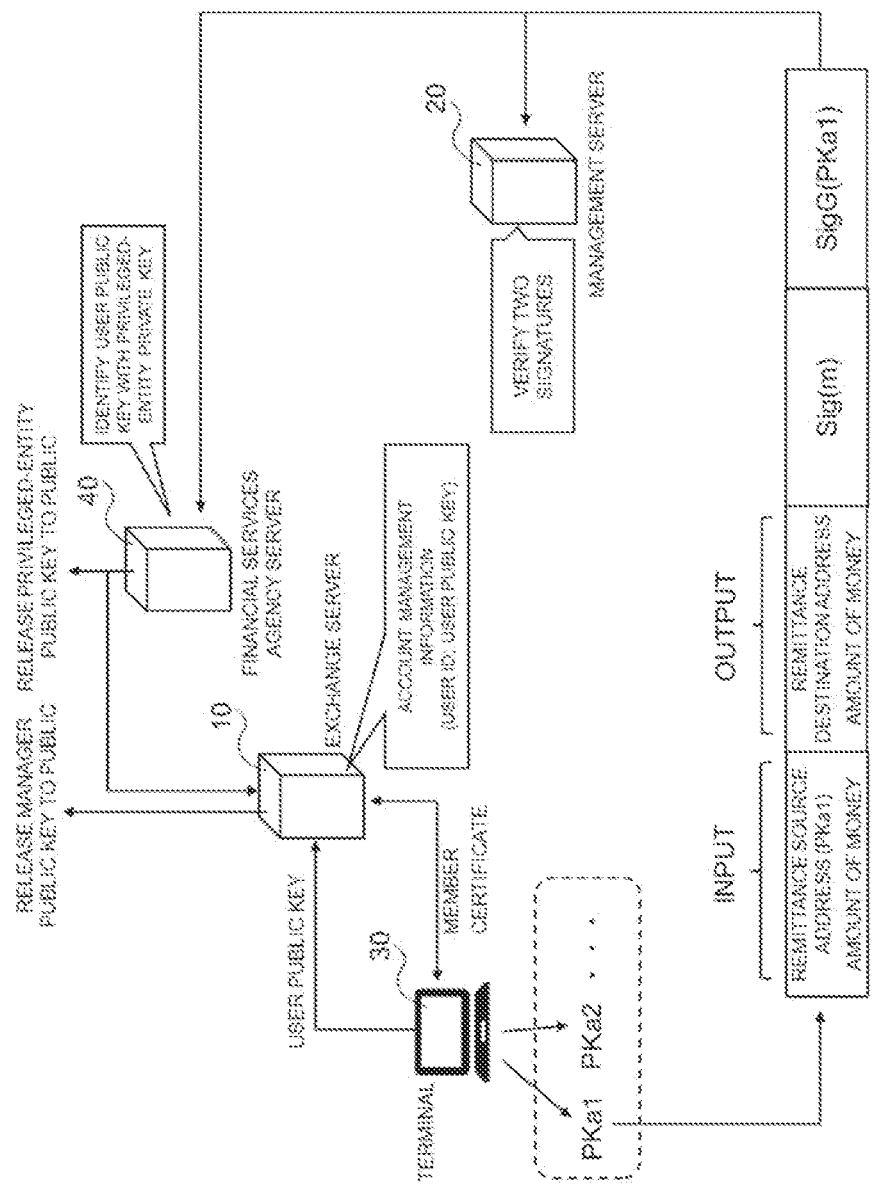
FIG. 11 is a diagram for illustrating an outline of operation of the cryptocurrency system according to the second example embodiment.

For example, in the example of FIG. 11, the terminal 30 generates a plurality of account public keys, such as account public keys PKa1, PKa2, . . . . The terminal 30 uses one of the plurality of account public keys as a "remittance source address". In the example of FIG. 11, the account public key PKa1 is used as the remittance source address.

In the example of FIG. 11, the terminal 30 generates a signature Sig (m) for the trading content using the account private key corresponding to the selected account public key, and also generates a group signature SigG (PKa1) for the selected account public key PKa1. These two signatures are described in the transaction. The terminal 30 broadcasts the transaction including the two signatures to the management server 20.

The management server 20 verifies the two signatures included in the acquired transaction. When verification of the two signatures succeeds, the management server 20 determines that the transaction is an authorized transaction, and additionally writes the transaction in the blockchain.

In this manner, the management server 20 verifies the group signature of the account public key added to the transaction. When the signature is valid, the management server 20 determines that the transaction is a transaction of a user who has opened an account in an authorized exchange approved by the Financial Services Agency. In other words, the management server 20 determines that a transaction to which an invalid group signature is added or a transaction to which no group signature is added is an unauthorized transaction, and does not additionally write the transaction in the blockchain.

Regarding privacy of a user, because the exchange server 10 does not store the privileged-entity private key, the exchange server 10 cannot identify the remittance source from the transaction on the blockchain. Because the account public key used as the remittance source address and the personal information (for example, a name and the like) of the user are not associated with each other to be managed at the exchange, and thus the exchange server 10 cannot deduce the remittance source form the transaction. In addition, it is also possible to generate a new account public key every time for the remittance source address set by the user when using the cryptocurrency, and thus anonymity is further enhanced.

Note that it can be assumed that a criminal opens an account in the exchange with the aim of money laundering or the like. In this case, the transaction with the aim of money laundering as above is also handled as an authorized transaction, and is described in a blockchain.

By using the privileged-entity private key regarding trading (transaction) suspected of money laundering or the like, the Financial Services Agency server 40 can deduce the user public key of the remittance source of the transaction. The Financial Services Agency notifies the exchange server 10 of the deduced user public key, and acquires a corresponding name and the like. The name and the like acquired in such a procedure as described above are utilized for criminal investigation.

Next, each apparatus constituting the cryptocurrency system according to the second example embodiment will be described.

[Financial Services Agency Server]

The Financial Services Agency server 40 has a function of identifying the user (terminal 30) that has generated a transaction. The Financial Services Agency server 40 according to the second example embodiment has a role as a "privileged entity" described in NPL 2.

Figure 12:
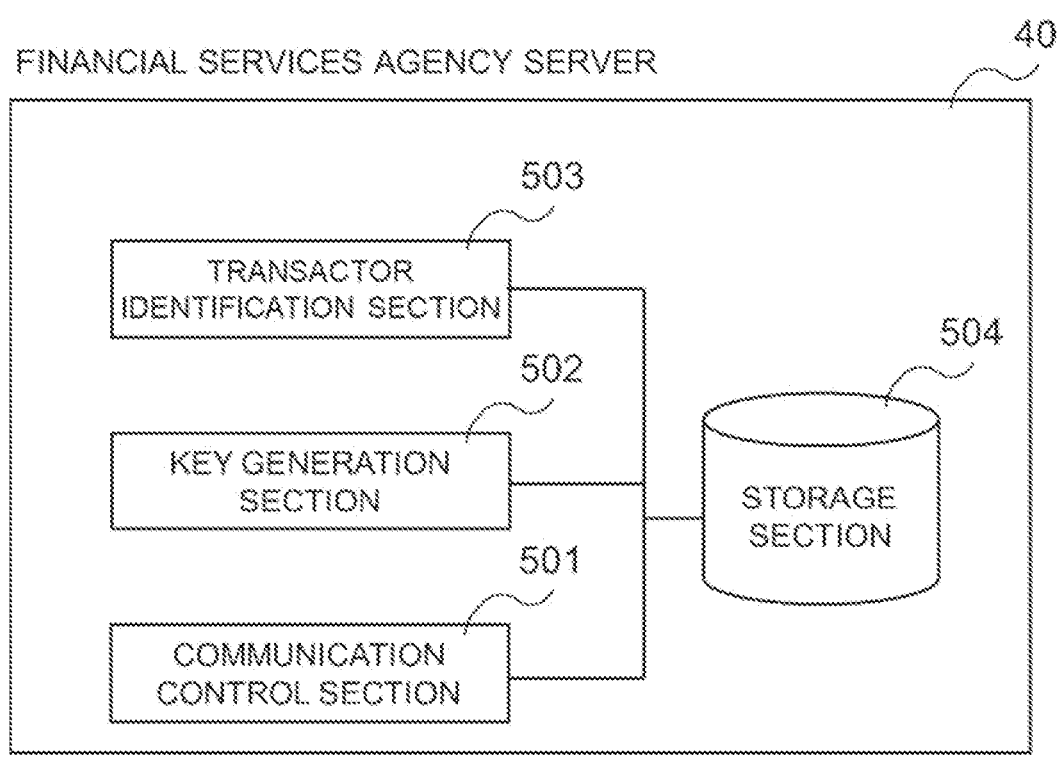
FIG. 12 is a diagram illustrating an example of a processing configuration of a Financial Services Agency server according to the second example embodiment.

FIG. 12 is a diagram illustrating an example of a processing configuration (processing module) of the Financial Services Agency server 40 according to the second example embodiment. With reference to FIG. 12, the Financial Services Agency server 40 includes a communication control section 501, a key generation section 502, a transactor identification section 503, and a storage section 504.

The communication control section 501 is a means that implements communication with another apparatus. The communication control section 501 is also a means that distributes a message (packets) received from another apparatus to respective processing modules, or that transmits a message acquired from each processing module to another apparatus.

The key generation section 502 generates a pair of a privileged-entity public key and a privileged-entity private key used for a group signature. The key generation section 502 releases the privileged-entity public key to the public. The privileged-entity public key is acquired at least by the terminal 30 and the exchange server 10 participating in the cryptocurrency system.

The transactor identification section 503 is a means that identifies a transactor of the transaction described in the blockchain. When the transactor identification section 503 converts data included in the group signature using the privileged-entity private key, the transactor identification section 503 can extract the user public key of each terminal 30.

In this manner, the transactor identification section 503 can identify the user public key generated by the terminal 30. The transactor identification section 503 can acquire the transaction from the blockchain and can uniquely identify the terminal 30 (can track the user) that has transmitted the transaction based on the group signature. As a result, the Financial Services Agency (Financial Services Agency server 40) can be informed of the details of the trading in the cryptocurrency system.

[Exchange Server]

The exchange server 10 according to the second example embodiment has a function of issuing a member certificate distributed to users who have opened an account. The exchange server 10 according to the second example embodiment includes a role as a "manager" described in NPL 2.

Figure 13:
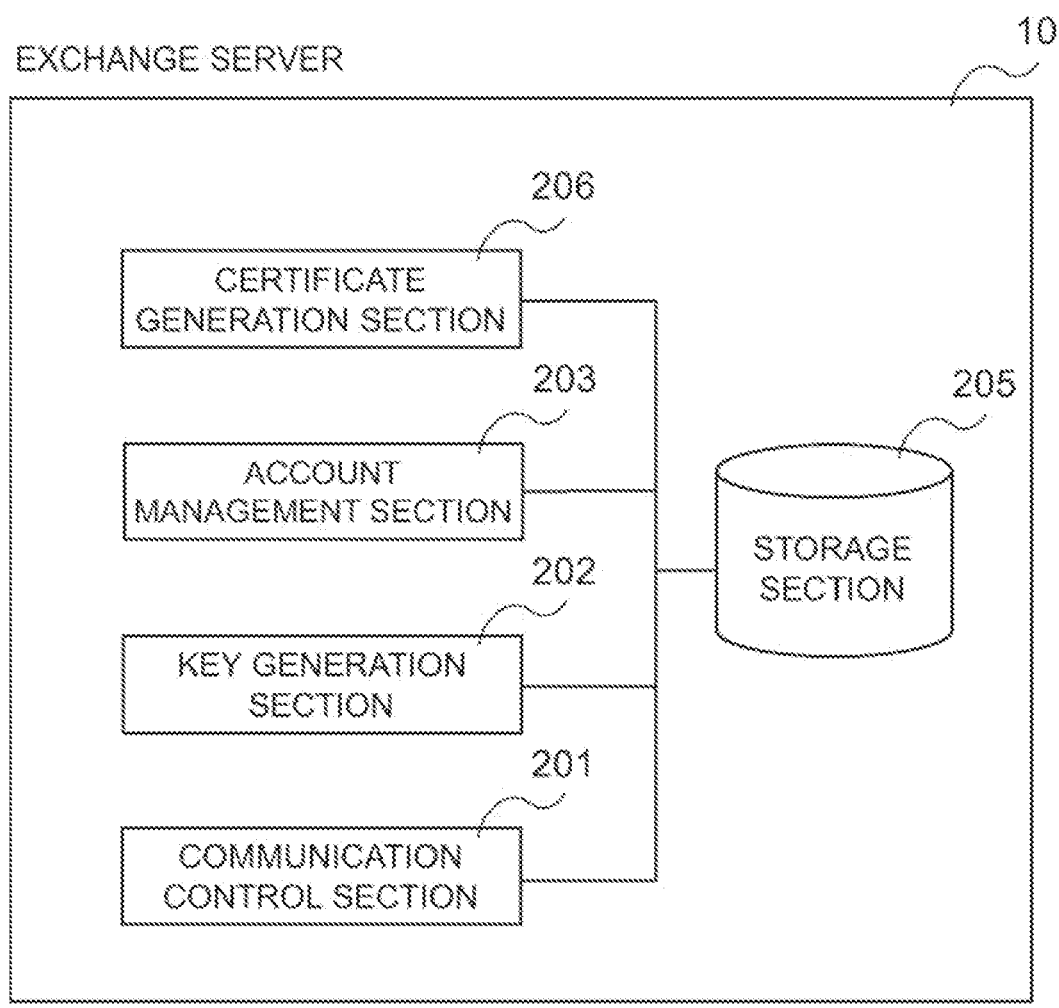
FIG. 13 is a diagram illustrating an example of a processing configuration of an exchange server according to the second example embodiment.

FIG. 13 is a diagram illustrating an example of a processing configuration (processing module) of the exchange server 10 according to the second example embodiment. In the exchange server 10 according to the first and second example embodiments, a function of the key generation section 202 and new provision of a certificate generation section 206 are main differences.

The differences will mainly be described.

The key generation section 202 generates a pair of a manager public key and a manager private key used for a group signature. The key generation section 202 releases the manager public key to the public. The manager public key released to the public is acquired at least by the terminal 30.

When identity of a user is verified, the account management section 203 delivers the user public key to the certificate generation section 206, and instructs the certificate generation section 206 to generate a member certificate.

The certificate generation section 206 is a means that generates and issues a "member certificate" that is required when the terminal 30 generates a group signature. The certificate generation section 206 generates a member certificate in cooperation with a certificate acquisition section 306 of the terminal 30 to be described later. The certificate generation section 206 generates the member certificate by using the user public key provided from the terminal 30. The certificate generation section 206 delivers the generated member certificate to the account management section 203.

The account management section 203 distributes the member certificate acquired from the certificate generation section 206 to the terminal 30.

The exchange server 10 and the terminal 30 generate the member certificate that guarantees validity of the user public key with the manager private key by complying with the "user registration protocol" illustrated in FIG. 5 of NPL 2.

[Terminal]

Figure 14:
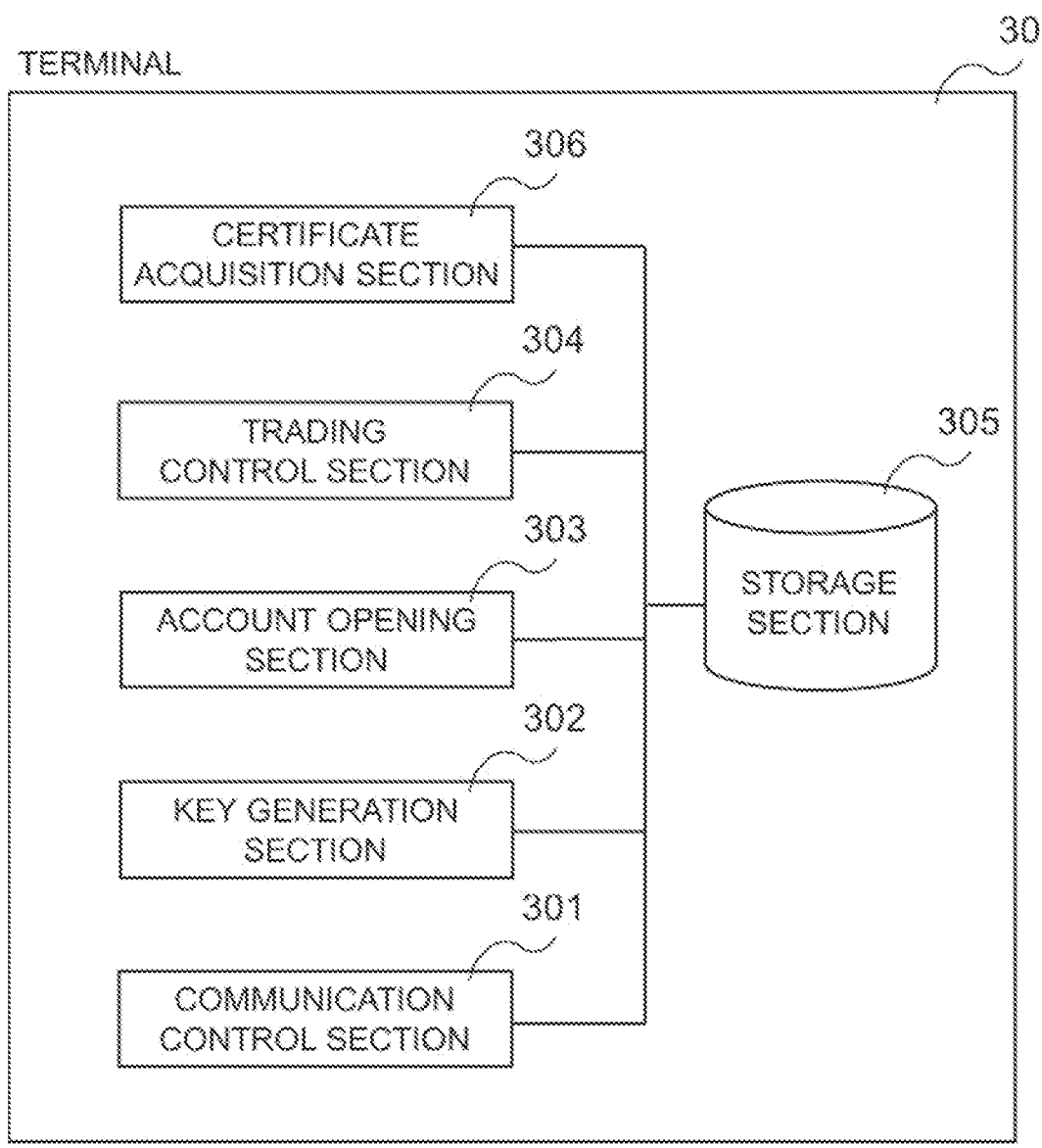
FIG. 14 is a diagram illustrating an example of a processing configuration of a terminal according to the second example embodiment.

FIG. 14 is a diagram illustrating an example of a processing configuration (processing module) of the terminal 30 according to the second example embodiment. In the terminal 30 according to the first and second example embodiments, operation of the key generation section 302 and the trading control section 304 and inclusion of the certificate acquisition section 306 are main differences.

The differences will mainly be described.

The key generation section 302 generates a key pair of at least one account public key and a private key in addition to the key pair of a user public key and a private key. The generated account private key is stored in the storage section 305.

The certificate acquisition section 306 is a means that creates a member certificate in cooperation with the certificate generation section 206 of the exchange server 10 installed in an authorized institution approved by the Financial Services Agency and acquires the member certificate from the exchange server 10. The member certificate acquired from the exchange server 10 is stored in the storage section 305.

The trading control section 304 adds two signatures to the transaction, similarly to the first example embodiment.

The trading control section 304 generates a signature (first signature described above) by using the account private key for the trading content.

In addition, the trading control section 304 generates a group signature (second signature described above) for proving that the own apparatus (terminal 30) is a member of an authorized institution (exchange) having authority to open an account. The trading control section 304 generates the group signature by using the user private key generated by the key generation section 302, the member certificate acquired from the exchange server 10 to which account opening is requested, and the privileged-entity public key.

The target of the group signature is the account public key used as the remittance source address.

Generation of the group signature can be performed in accordance with "group signature creation algorithm" illustrated in FIG. 6 of NPL 2.

When generation of the group signature ends, the trading control section 304 adds its own signature (signature using the user private key) for the trading content and the group signature to the transaction, and transmits the transaction to the management server 20.

[Management Server]

A basic processing configuration of the management server 20 according to the second example embodiment can be the same as that of the first example embodiment. Thus, description corresponding to FIG. 7 of the management server 20 according to the second example embodiment will be omitted.

When the management server 20 according to the second example embodiment determines whether or not a transaction can be accepted, the management server 20 verifies two signatures (a signature of the terminal 30 for the trading content and a group signature) similarly to the first example embodiment.

Specifically, the transaction verification section 411 verifies the signature of the terminal 30 for the trading content by using the account public key, similarly to the first example embodiment.

The transaction verification section 411 verifies the group signature. As described above, the manager public key and the privileged-entity public key are released to the public, and thus the transaction verification section 411 performs verification of the group signature added to the transaction by using these public keys (manager public key and privileged-entity public key).

Note that verification of the group signature can be performed in accordance with "group signature verification algorithm" illustrated in FIG. 7 of NPL 2.

When verification of the two signatures becomes successful as a result of the verification, the ledger management section 402 handles the transaction as a target to be written in the blockchain. In other words, when verification of the two signatures succeeds, each of the management servers writes the received transaction in the blockchain as an authorized transaction.

In contrast, when verification of at least one of the two signatures fails as a result of the verification, the ledger management section 402 discards the transaction.

As described above, for issue of the member certificate, creation of the group signature, verification of the group signature, and the like, the algorithm and the protocol disclosed in NPL 2 can be used. The disclosure of NPL 1 can be referred to for further details of the algorithm and the like. Here, with reference to the drawings, general operation when the group signature is introduced to the cryptocurrency system in conformity with the description of NPL 2 will be described.

Note that symbols used in expressions of the disclosure of the present application are as follows:
N: Product of two prime numbers
A, a, b: Element of a factor ring
g, u: Element of a prime field
H: Hash function
c: Hash value
P, p, q: Prime number
r, s, x, v, ρ, τ: Random number
k: Integer With reference to FIG. 10 and FIG. 11, each exchange is handled as one group. In one group (exchange), a plurality of members have their accounts. The exchange server 10 and the Financial Services Agency server 40 generate a pair of a manager public key and a manager private key and a pair of a privileged-entity public key and a privileged-entity private key at the time of starting operation of the cryptocurrency system, respectively.

Here, the manager public key, the privileged-entity public key, the manager private key, and the privileged-entity private key are defined as in the following expressions (1) to (4).

[Math. 1]

$$\text{MANAGER PUBLIC KEY:} gpk := (N, a_0, a_1, a_2, k_e, H) \quad (1)$$

[Math. 2]

$$\text{PRIVILEGED-ENTITY PUBLIC KEY:} gpk_2 = (g_1, g_2, g_3, p, q) \quad (2)$$

[Math. 3]

$$\text{MANAGER PRIVATE KEY:} (p_1, p_2) \text{ s.t. } N = p_1 p_2 \quad (3)$$

[Math. 4]

$$\text{PRIVILEGED ENTITY PRIVATE KEY:} y \text{ s.t. } g_2 = g_1^y \mod P \quad (4)$$

Each user who has opened an account in each exchange server 10 is assigned a user ID.

As described above, processing related to member registration (user registration) is executed between the exchange server 10 and the terminal 30.

Here, the user public key and the user private key are defined as in the following expressions (5) and (6).

[Math. 5]

$$\text{USER PUBLIC KEY:} h = g_2 \times \mod P \quad (5)$$

[Math. 6]

$$\text{USER PRIVATE KEY:} (x, r)s, t, a_0 a_1 \times a_2' = A^e \mod N \quad (6)$$

The terminal 30 generates the user private key as shown in the above expression (6), and generates information obtained through conversion from the generated user private key. Specifically, as described in NPL 2, the terminal 30 randomly selects x, r', and generates information represented by the following expression (7).

[Math. 7]

$$A' \leftarrow a_1 \times a_2 r' \mod N \quad (7)$$

The terminal 30 transmits information represented in above (7) (information obtained through conversion of the user private key) and the user public key represented by above (5) to the exchange server 10. The exchange server 10 complies with the protocol described in FIG. 5 of NPL 2, and generates the member certificate shown in the following expression (8).

[Math. 8]

$$\text{MEMBER CERTIFICATE:} (A, e) \quad (8)$$

For group signature generation, the terminal 30 prepares the member certificate issued from the exchange server 10 and the generated user private key. For example, the terminal 30 assigned ID=i (i is a positive integer; the same applies hereinafter) prepares a member certificate (Ai, ei) and a user private key sk (i). The member certificate (Ai, ei) and the private key sk (i) transmitted to each terminal 30 serves as a private key sk (gs) for group signature generation related to each terminal 30. Note that, in the following description, a terminal assigned ID=i is referred to as a terminal (i).

The terminal (i) generates a group signature. For example, at the time of group signature generation, the terminal (i) with the member certificate (Ai, ei) applies the private key sk (gs) for group signature generation and the privileged-entity public key to an account public key PKa being a target of the signature, to generate a group signature sig (i, PKa).

More specifically, the terminal (i) randomly selects s, v, and then calculates information represented by the following expressions (9) and (10).

[Math. 9]

$$b \leftarrow a_2^e A \bmod N \quad (9)$$

[Math. 10]

$$(u_1, u_2, u_3) \leftarrow (g_1^v, hg_2^v, g_3^{v+e}) \bmod P \quad (10)$$

Next, the terminal (i) randomly selects $\rho_x, \rho_r, \rho'_e, \rho_v$, and then obtains the group signature, using the following expressions (11) to (16).

[Math. 11]

$$\bar{b} \leftarrow b^{\rho'_e} a_1^{-\rho_x} a_2^{-\rho_r} \bmod N \quad (11)$$

[Math. 12]

$$(\bar{u_1}, \bar{u_2}, \bar{u_3},) \leftarrow \left(g_1^{\rho_v}, g_2^{\rho_v+\rho_x}, g_3^{\rho_v+\rho'_e}\right) \bmod P \quad (12)$$

[Math. 13]

$$c = H\left(gpk_1, gpk_2, b, u_1, u_2, u_3, \bar{b}, \bar{u_1}, \bar{u_2}, \bar{u_3}, M\right) \quad (13)$$

[Math. 14]

$$\tau_x = \rho_x + cx, \tau_r = \rho_r + c(r + se) \quad (14)$$

[Math. 15]

$$\tau'_e = \rho'_e + ce', \tau_v = \rho_v + cv \bmod q \quad (15)$$

[Math. 16]

$$Sig = (b, u_1, u_2, u_3, c, \tau_x, \tau_r, \tau'_e, \tau_v) \quad (16)$$

The group signature has a zero-knowledge proof function of guaranteeing two matters. Specifically, the following two matters are guaranteed with the use of the group signature: a matter that the terminal has the member certificate issued by an entity having a correct manager private key corresponding to the manager public key of the exchange, and a matter that the member certificate can be correctly identified by an entity having a correct privileged-entity private key corresponding to the privileged-entity public key.

Next, an outline of verification using the group signature and tracking will be described. As described above, the management server 20 performs verification of the group signature added to the transaction. Specifically, the management server 20 verifies the group signature by using the manager public key and the privileged-entity public key released to the public. More specifically, the management server 20 performs verification of the group signature depending on whether or not the following expressions (17) to (19) are satisfied.

[Math. 17]

$$\bar{b} \leftarrow b^{c2^{ke+r'}e} \alpha_0^{-e} \alpha_1^{-\tau_x} \alpha_2^{-\tau_r} \bmod N \quad (17)$$

[Math. 18]

$$(\bar{u_1}, \bar{u_2}, \bar{u_3}) \leftarrow (u_1^{-c} g_1^{\tau_v}, u_2^{-c} g_2^{\tau_v+\tau_x}, u_3^{-c} g_3^{\tau_v+\tau_e'}) \bmod P \quad (18)$$

[Math. 19]

$$c = H(gpk_1, gpk_2, b, u_1, u_2, u_3, \bar{b}, \bar{u_1}, \bar{u_2}, \bar{u_3}, M) \quad (19)$$

For example, when validity of the group signature is guaranteed with the manager public key and the privileged-entity public key of an exchange A, it is proved that the transaction to which the group signature is added is a valid customer of the exchange A approved by the Financial Services Agency. In addition, the Financial Services Agency identifies the terminal 30 that has generated the transaction.

In this manner, through verification of the group signature using the manager public key and the privileged-entity public key, it is proved as to whether or not the user who has requested writing of the transaction in the blockchain is a user having a valid qualification who has opened an account in the exchange. However, the terminal 30 that has written the transaction in the blockchain is not identified only with the verification. In other words, with the use of the group signature, information that can be known is limited to information related to validity of the terminal 30 that has written the transaction in the blockchain.

In contrast, the Financial Services Agency that supervises the exchange can uniquely identify the terminal 30 that has added the group signature by using the privileged-entity private key. Specifically, the Financial Services Agency server 40 can uniquely identify the terminal 30 that has generated the group signature by calculating the following expression (20).

[Math. 20]

$$h = u_2/u_1^y \quad (20)$$

When the Financial Services Agency server 40 converts data included in the group signature using the privileged-entity private key, the Financial Services Agency server 40 can extract a user public key h of the terminal 30. The Financial Services Agency server 40 can identify the terminal 30 from the extracted user public key.

[Operation of System]

Figure 15:
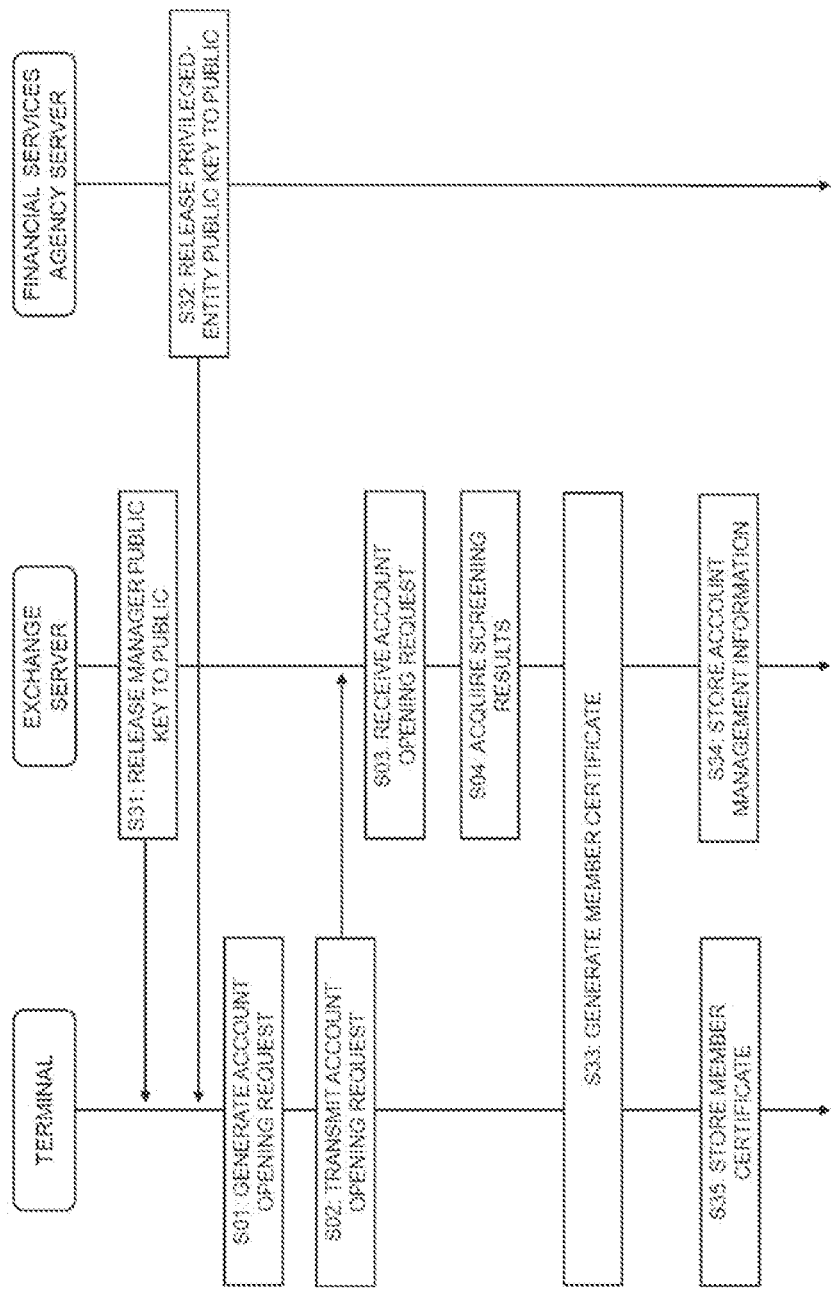
FIG. 15 is a sequence diagram illustrating an example of operation related to account opening in the cryptocurrency system according to the second example embodiment.

Next, operation of the cryptocurrency system according to the second example embodiment will be described. FIG. 15 is a sequence diagram illustrating an example of operation related to account opening in the cryptocurrency system according to the second example embodiment. In FIG. 15, processes the same as those of FIG. 8 are denoted by the same reference signs (step names), and description thereof will be omitted.

The exchange server 10 and the Financial Services Agency server 40 release respectively the manager public key and the privileged-entity public key to the public in advance (Steps S31 and S32).

When the results of identity verification of the user are "account opening permitted", the exchange server 10 generates a member certificate in cooperation with the terminal 30 (Step S33).

When the exchange server 10 opens an account of the terminal 30, the exchange server 10 stores account management information (Step S34).

The terminal 30 stores the acquired member certificate (Step S35).

Note that an outline of operation related to remittance processing in the cryptocurrency system according to the second example embodiment can be the same as that of FIG. 9, and detailed description thereof will thus be omitted. The management server 20 performs verification of the group signature extracted from the transaction in Step S13 of FIG. 9.

As described above, in the cryptocurrency system according to the second example embodiment, the group signature is added to the transaction. It is guaranteed that the transaction to which a valid group signature is added is a transaction transmitted by a user who has an account in an exchange approved by the Financial Services Agency. In other words, similarly to the first example embodiment, the group signature added to the transaction is a signature enabling to verify a validity of the remittance source address described in the trading content.

Similarly to the first example embodiment, the management server 20 handles the transaction that has succeeded in verification of the group signature as an authorized transaction, and describes the transaction in the blockchain. Only the Financial Services Agency having the privileged-entity private key can extract the user public key from the transaction to which the group signature is added, and thus privacy of the user is appropriately protected. The Financial Services Agency can also identify the remittance source of the transaction by exercising authority as a privileged entity.

Third Example Embodiment

Next, a third example embodiment will be described in detail with reference to the drawings.

In the second example embodiment, a function as a privileged entity related to the group signature and a function as a manager are separated for the Financial Services Agency and the exchange. However, with this configuration, in which of the plurality of exchange servers 10 the user has an account is revealed.

Because the privileged-entity public key and the manager public key are released to the public, a third party that has acquired these can perform verification of the group signature added to the transaction. The third party can identify the exchange server 10 from the manager public key released to the public.

When information related to the exchange in which the user has an account is also considered as personal information, there will be a demand that the information be concealed as well. In the third example embodiment, satisfaction of the demand will be described.

Figure 16:
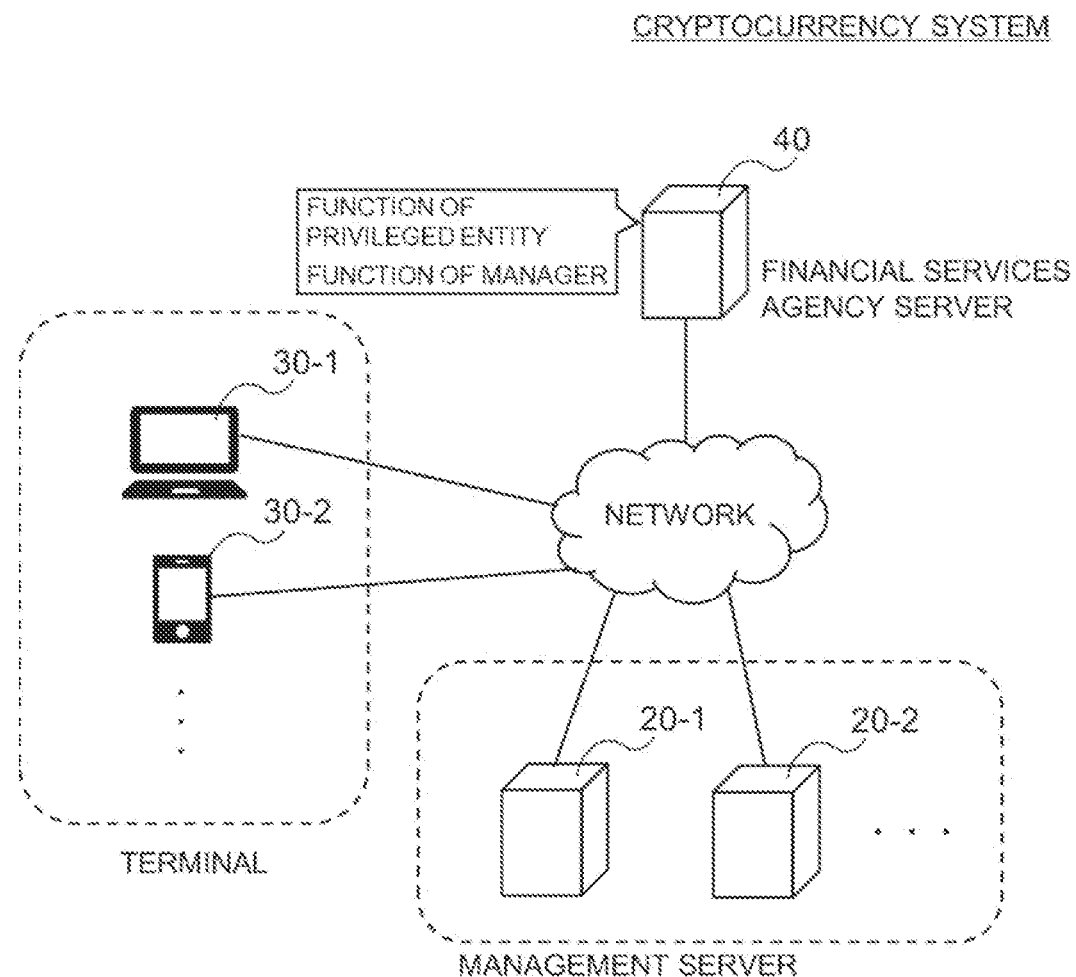
FIG. 16 is a diagram illustrating an example of a schematic configuration of a cryptocurrency system according to a third example embodiment.

FIG. 16 is a diagram illustrating an example of a schematic configuration of a cryptocurrency system according to the third example embodiment. With reference to FIG. 16, the exchange server 10 is not included in the cryptocurrency system. In the third example embodiment, the function of the exchange server 10 described in the second example embodiment is implemented in the Financial Services Agency server 40.

Figure 17:
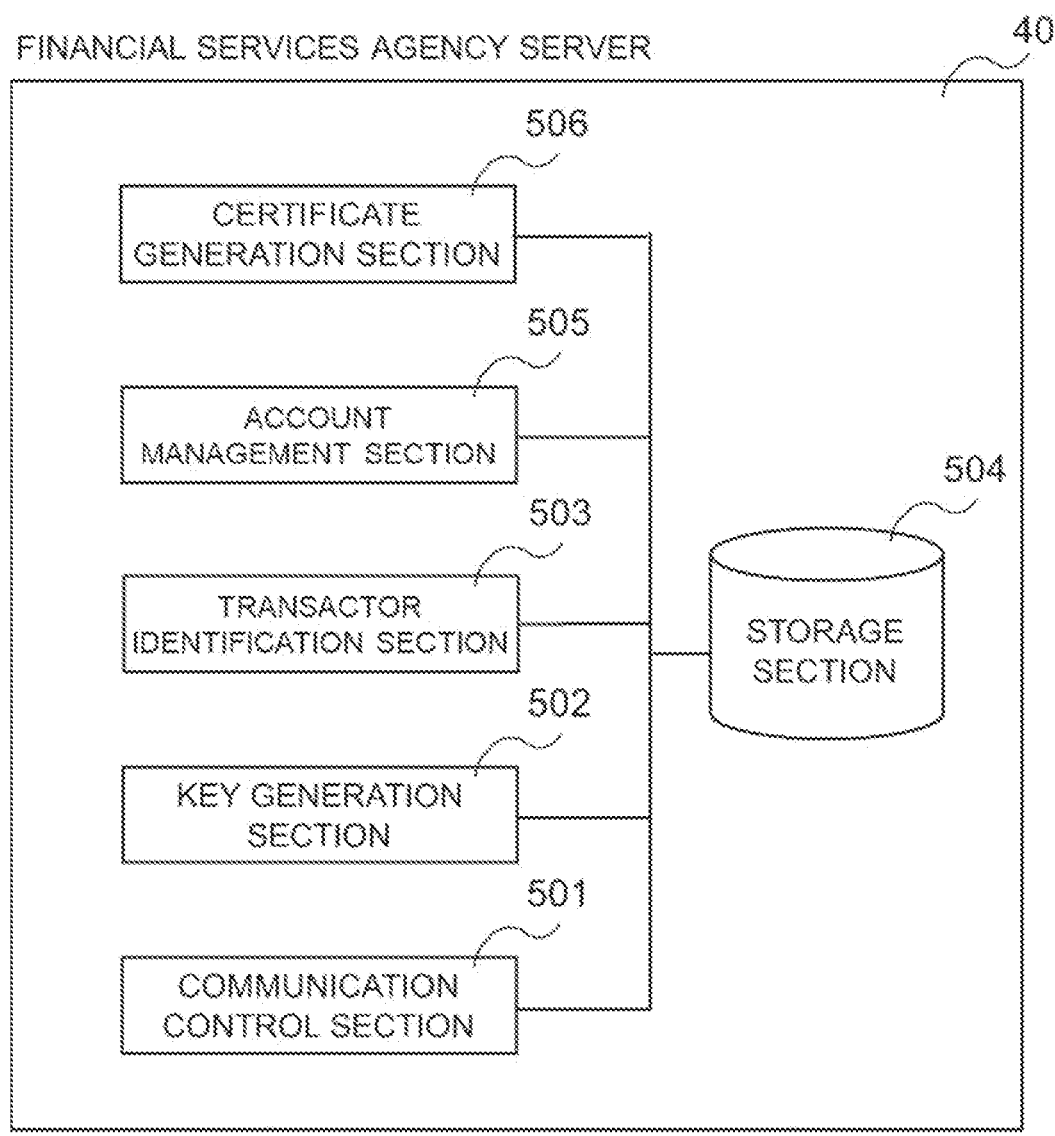
FIG. 17 is a diagram illustrating an example of a processing configuration of a Financial Services Agency server according to the third example embodiment.

In the Financial Services Agency server 40, processing modules related to the "account management section" and the "certificate generation section" included in the exchange server 10 of the second example embodiment are implemented (see FIG. 17). As illustrated in FIG. 17, the Financial Services Agency server 40 includes a management section 505 and a certificate generation section 506. Note that operation of the processing modules illustrated in FIG. 17 can be the same as the processing modules described in the second example embodiment, and thus detailed description thereof will thus be omitted.

As described above, in the third example embodiment, the Financial Services Agency server 40 opens an account of the terminal 30. In this case, the Financial Services Agency server 40 releases the manager public key necessary for generation of the member certificate to the public, and also releases the privileged-entity public key necessary for generation of the group signature to the public. The trading control section 304 of the terminal 30 generates the group signature for the account public key by using the member certificate, the privileged-entity public key released to the public, and the user private key. The group signature merely indicates that the account of the terminal 30 participating in the cryptocurrency system is an account legitimately opened for the Financial Services Agency, and does not provide any further information. As a result, even when a third party performs verification of the group signature added to the transaction, there is no knowing of personal information related to account opening. In this manner, with the function as a privileged entity of the group signature and the function as a manager being integrated in the Financial Services Agency server 40, personal information of the user participating in the cryptocurrency system is appropriately protected.

Fourth Example Embodiment

Next, a fourth example embodiment will be described in detail with reference to the drawings.

In the second example embodiment, the group signature is generated for the account public key of a remitting entity and is added to the transaction. In this case, the Financial Services Agency being a privileged entity can identify the "remittance source" by using the privileged-entity private key. However, the Financial Services Agency cannot deduce the "remittance destination" from the transaction.

Strictly speaking, when the user of the remittance destination described in the transaction performs a new trading and writes a new transaction in the blockchain as the remittance source, the Financial Services Agency can deduce identity of the user. However, there is no telling when the remittance destination writes a new transaction in the blockchain, and there may be a delay in investigation performed by the Financial Services Agency.

In this manner, there has been a demand of identifying the remittance destination from the transaction. In the fourth example embodiment, in order to satisfy the demand, and thus the group signature is added to the transaction also regarding an account of the remittance destination.

A schematic configuration of the cryptocurrency system according to the fourth example embodiment can be the same as that of FIG. 10, and description thereof will thus be omitted. Internal processing (processing configuration) of each apparatus constituting the cryptocurrency system according to the fourth example embodiment can also be the same as that of the second example embodiment, and description of the figures corresponding to FIG. 12 and the like will thus be omitted.

Figure 18:
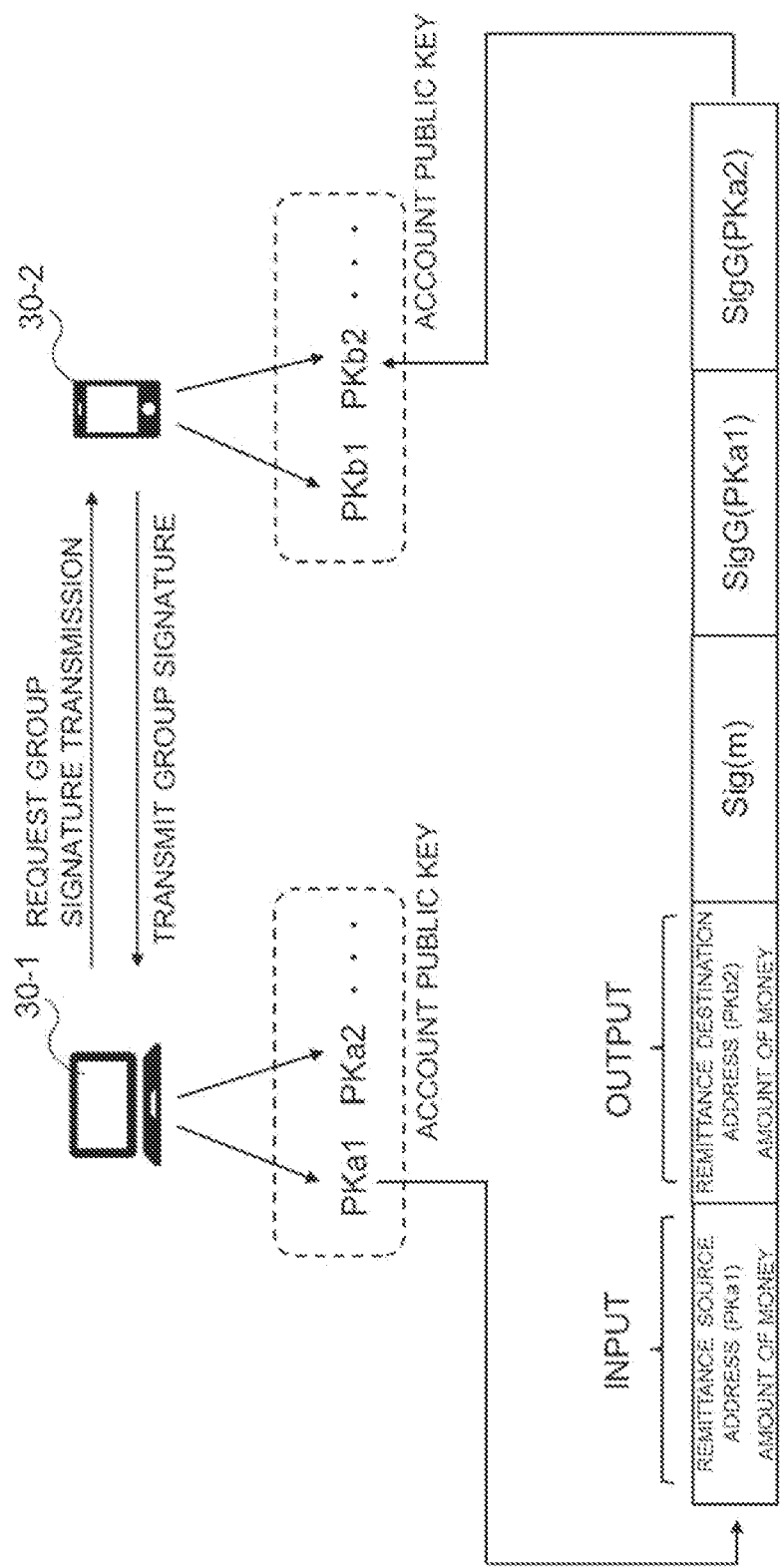
FIG. 18 is a diagram for illustrating general operation of a cryptocurrency system according to a fourth example embodiment.

FIG. 18 is a diagram for illustrating general operation of the cryptocurrency system according to the fourth example embodiment. As illustrated in FIG. 18, each user (terminal 30) participating in the cryptocurrency system generates a plurality of account public keys used for trading of the cryptocurrency.

Here, a case in which the terminal 30-1 remits to the terminal 30-2 by using an account public key PKa1 is considered. The terminal 30-2 receives the money by using an account public key PKb2.

The terminal 30-1 requests the terminal 30-2 being a remittance destination to transmit the group signature corresponding to an account (account public key) where the money is received before transmitting the transaction to the management server 20.

The terminal 30-2 that has received the request generates a group signature for the account public key PKb2, and returns the generated group signature to the terminal 30-1. Note that the terminal 30-2 also acquires a member certificate from the exchange server 10 approved by the Financial Services Agency, and generates a group signature by using the certificate or the like.

When the terminal 30-1 acquires the group signature from the terminal 30-2 being a remittance destination, the terminal 30-1 generates a transaction by using the acquired group signature. Specifically, the terminal 30-1 adds the group signature of the remittance destination (the signature for the account public key PKb2; SigG (PKb2)) as well as its own group signature (the signature for the account public key PKa1; SigG (PKa1)) to the transaction.

The management server 20 according to the third example embodiment verifies three signatures added to the transaction (signature Sig (m) using the account private key of the remittance source, the group signature SigG (PKa1) of the remittance source, and the group signature SigG (PKb2) of the remittance destination).

When verification of each of the three signatures becomes successful, the management server 20 handles the transaction as an authorized transaction and describes the transaction in the blockchain. Note that a group signature transmission request and its response of the terminal 30-1 and the terminal 30-2 are performed by the trading control section 304 of each terminal 30. Verification of the transaction by the management server 20 is performed by the transaction verification section 411.

As described above, in the fourth example embodiment, the terminal 30 acquires the group signature for the remittance destination address described in the trading content from the terminal 30 of the remittance destination. The terminal 30 generates a transaction including the above three signatures. In this manner, in the fourth example embodiment, the group signature of the remittance destination is also added to the transaction and is transmitted to the management server 20. As a result, the Financial Services Agency can directly obtain the user public key of the remittance destination from the group signature of the remittance destination. In other words, the Financial Services Agency can identify the user (user public key) of the remittance destination from the transaction stored in the blockchain.

Fifth Example Embodiment

Next, a fifth example embodiment will be described in detail with reference to the drawings.

In the example embodiment such as the second example embodiment, the Financial Services Agency of one nation manages a plurality of exchanges in the nation. In the fifth example embodiment, a case in which exchanges of a plurality of nations are included in the cryptocurrency system will be described.

Figure 19:
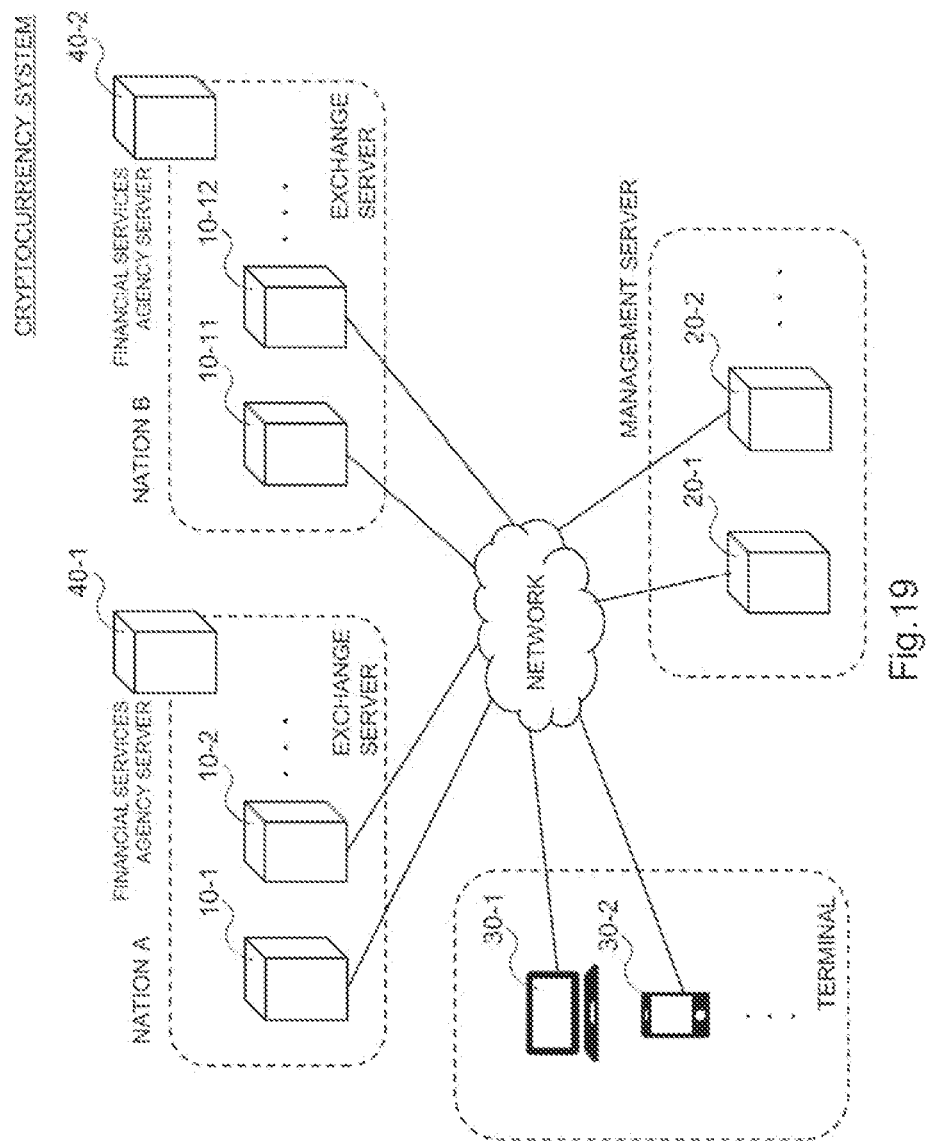
FIG. 19 is a diagram illustrating an example of a schematic configuration of a cryptocurrency system according to a fifth example embodiment.

FIG. 19 is a diagram illustrating an example of a schematic configuration of a cryptocurrency system according to the fifth example embodiment. As illustrated in FIG. 19, a plurality of Financial Services Agency servers 40 that manage the exchange servers 10 of respective nations are included in the cryptocurrency system.

A configuration, operation, and the like of the exchange server 10, the terminal 30, and the Financial Services Agency server 40 can be the same as the details described in the second example embodiment and the like, and detailed description thereof will thus be omitted.

The terminal 30 generates a group signature by using a member certificate issued from the exchange in which an account has been opened (exchange of the same nation), and adds the signature to the transaction. When the management server 20 verifies the group signature added to the acquired transaction, the management server 20 uses the privileged-entity public key released to the public from the Financial Services Agency (Financial Services Agency server 40) of each nation.

Here, the privileged-entity public key released to the public from the Financial Services Agency server 40 of each nation may be stored inside the management server 20, or may be described in the blockchain.

For example, an international institution or the like whose members include nations participating in the cryptocurrency system may input the privileged-entity public key generated by the Financial Services Agency server 40 of each nation to each of the management servers 20 managing the blockchain.

When the privileged-entity public key is described in the blockchain, the privileged-entity public key released to the public by the Financial Services Agency server 40 of the nation participating in the cryptocurrency system may be described in the first block.

Figure 20:
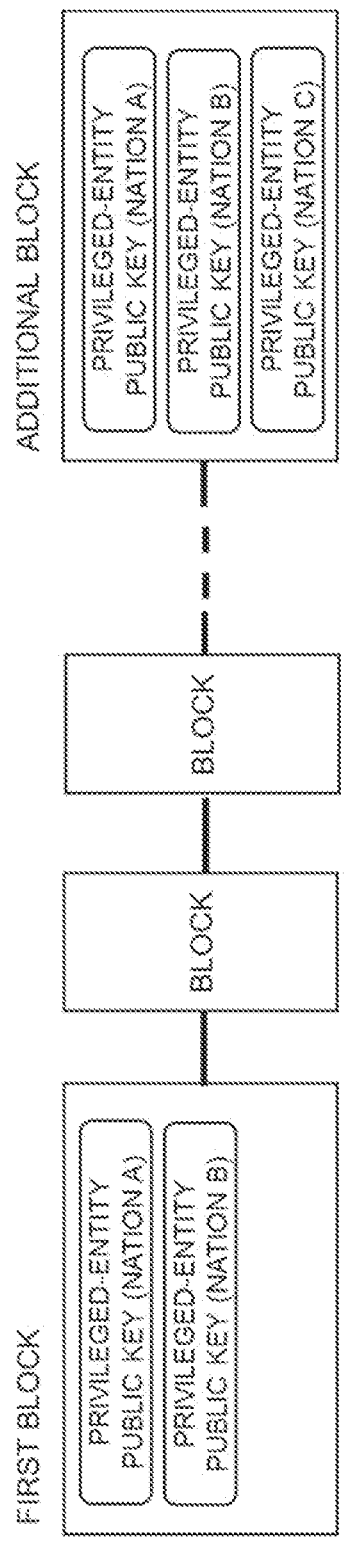
FIG. 20 is a diagram for illustrating operation of a management server according to the fifth example embodiment.

For example, as illustrated in FIG. 20, the privileged-entity public keys released to the public (generated) by the Financial Services Agency servers 40 of nation A and nation B are described in the first block. Subsequently, when nation C participates in the cryptocurrency system, the above-described international institution newly adds a block including the privileged-entity public key generated by the Financial Services Agency server 40 of nation C as information.

When verification of the transaction is required, the management server 20 searches the blockchain, and acquires a "privileged-entity public key list" from the latest block in which the privileged-entity public keys are described. When verification of the group signature with the use of the privileged-entity public keys included in the privileged-entity public key list does not succeed, the management server 20 determines that a corresponding transaction is an unauthorized transaction, and discards the transaction.

In this manner, by describing the privileged-entity public key list in the blockchain, transactions to which a group signature released to the public by an organization and an institution not approved by the international institution is added are eliminated. In other words, even if a criminal or the like establishes a server that resembles that of the Financial Services Agency server 40, the exchange server 10, or the like and adds a group signature to the transaction, the transaction is discarded because the privileged-entity public key generated by the criminal is not described in the blockchain.

As described above, in the fifth example embodiment, a plurality of Financial Services Agency servers 40 are included in the cryptocurrency system. In the fifth example embodiment, each of the plurality of management servers 20 performs verification of the group signature included in a transmitted transaction by using the privileged-entity public key released to the public by any one of the plurality of Financial Services Agency servers 40. In addition, the privileged-entity public keys released to the public by each of the plurality of Financial Services Agency servers 40 may be described in the blockchain. In that case, each of the plurality of management servers 20 performs verification of the group signature by using the privileged-entity public keys described in the blockchain. In this manner, the disclosure of the present application can be applied to global financial trading across a plurality of nations.

Sixth Example Embodiment

Next, a sixth example embodiment will be described in detail with reference to the drawings.

The second example embodiment describes the configuration that the Financial Services Agency server 40 acquires the transaction described in the blockchain, and can identify at least the remittance source. However, if such identification performed by the Financial Services Agency is unlimitedly performed, privacy of individuals will be threatened.

The sixth example embodiment will describe a cryptocurrency system that accepts identification by the Financial Services Agency only when identification is really necessary for criminal investigation or the like.

A schematic configuration of the cryptocurrency system according to the sixth example embodiment can be the same as that of FIG. 10, and description thereof will thus be omitted. Internal processing (processing configuration) of each apparatus constituting the cryptocurrency system according to the sixth example embodiment can also be the same as that of the second example embodiment, and description of the figures corresponding to FIG. 12 and the like will thus be omitted.

Figure 21:
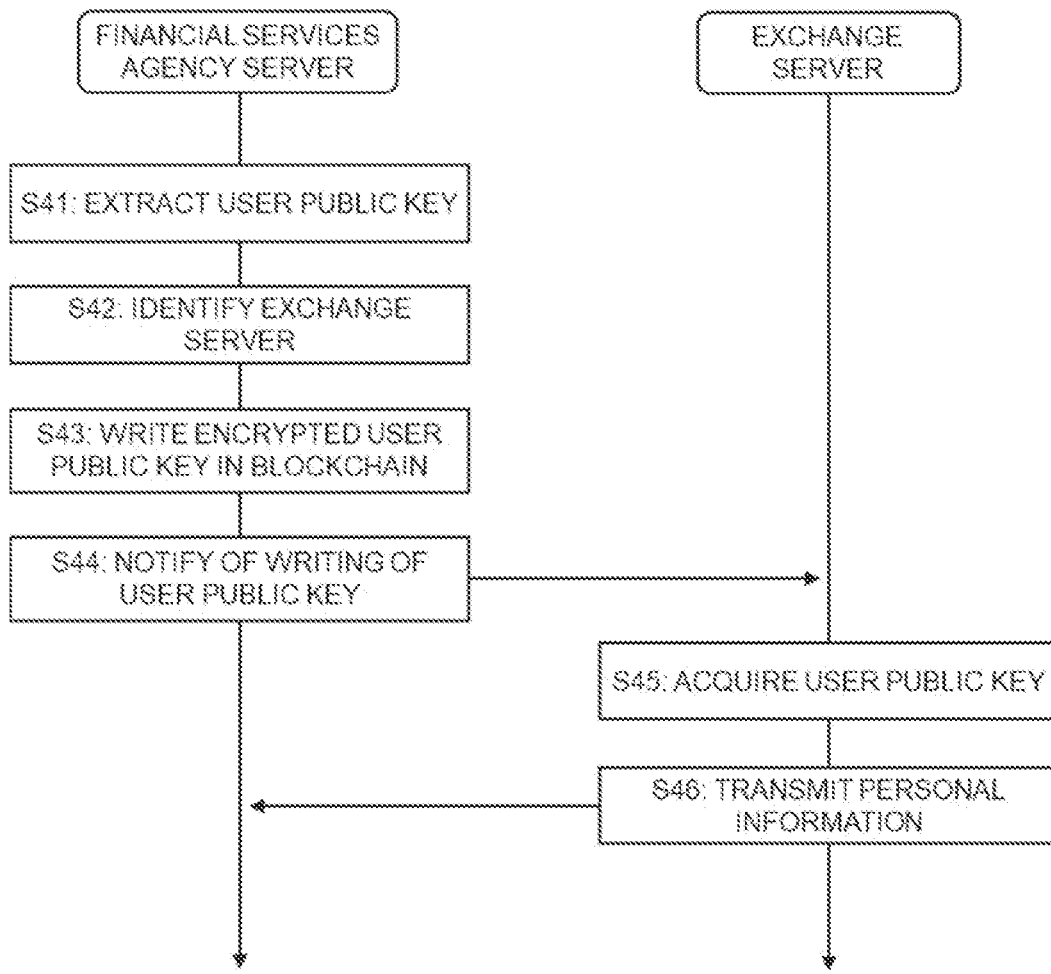
FIG. 21 is a sequence diagram for illustrating operation of a cryptocurrency system according to a sixth example embodiment.

FIG. 21 is a sequence diagram for illustrating operation of the cryptocurrency system according to the sixth example embodiment.

The Financial Services Agency server 40 extracts the user public key from the group signature of the transaction (Step S41).

The Financial Services Agency server 40 identifies the exchange server 10 that has personal information of a corresponding user from the extracted user public key (Step S42). For example, the Financial Services Agency server 40 acquires a list describing user public keys of users who have opened their accounts from each exchange server 10 in advance. The Financial Services Agency server 40 identifies the exchange server 10 that stores necessary personal information according to the list.

In Step S43, the Financial Services Agency server 40 encrypts the extracted user public key with the public key of the identified exchange server 10, and writes the encrypted user public key in the blockchain (requests the management server 20 to write the encrypted user public key).

The Financial Services Agency server 40 notifies the identified exchange server 10 of the fact that the user public key is written in the blockchain (Step S44).

In response to the notification, the exchange server 10 acquires the user public key from the blockchain (Step S45). Specifically, the exchange server 10 acquires the encrypted user public key from the blockchain and decrypts the encrypted user public key with its own private key.

The exchange server 10 reads, from the "account management information", personal information (for example, a name and the like) corresponding to the user public key notified from the Financial Services Agency server 40, and transmits the personal information to the Financial Services Agency server 40 (Step S46).

Note that the operation of the Financial Services Agency server 40 described in the sixth example embodiment is implemented by the transactor identification section 503. The operation of the exchange server 10 is implemented by the account management section 203.

As described above, in the sixth example embodiment, the Financial Services Agency server 40 transmits the user public key identified from the group signature to the plurality of management servers 20, and thereby writes the user public key in the blockchain. In response to the user public key being written in the blockchain, the exchange server 10 transmits personal information corresponding to the user public key written in the blockchain to the Financial Services Agency server 40 that has written the user public key in the blockchain. In this manner, in the sixth example embodiment, the Financial Services Agency registers the fact of an attempt to identify the remittance source of the transaction with the blockchain. Data on the blockchain can be checked by anyone, and thus if unlimited identification performed by the Financial Services Agency is performed, such a fact is described in the blockchain. In other words, participants who participate in the cryptocurrency system can monitor the number of times and frequency of identification performed by the Financial Services Agency, and thus an effect of preventing excessive exercise of authority by the Financial Services Agency can be expected. The data (user public key) described in the blockchain at the time of identification performed by the Financial Services Agency is encrypted, and thus entities other than the exchange holding the account management information corresponding to the encrypted user public key cannot identify an individual being a target of identification. As a result, problems related to privacy protection are not caused as well.

Figure 22:
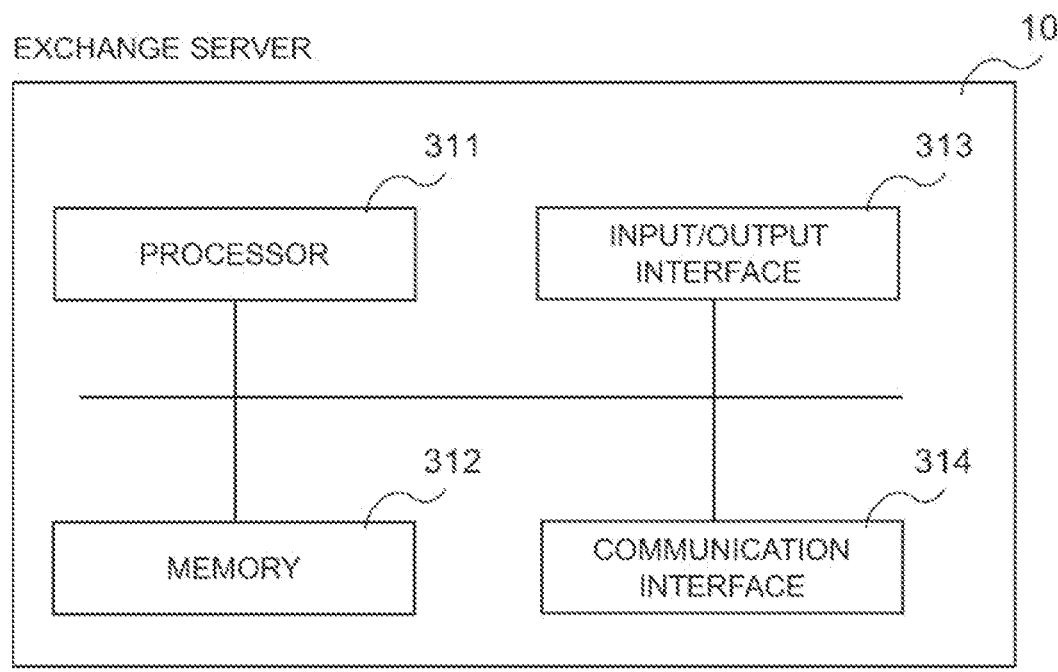
FIG. 22 is a diagram illustrating an example of a hardware configuration of the exchange server.

Next, hardware of each apparatus constituting the cryptocurrency system will be described. FIG. 22 is a diagram illustrating an example of a hardware configuration of the exchange server 10.

The exchange server 10 can be configured with an information processing apparatus (so-called, a computer), and includes a configuration illustrated in FIG. 22. For example, the exchange server 10 includes a processor 311, a memory 312, an input/output interface 313, a communication interface 314, and the like. Constituent elements of the processor 311 and the like are connected with an internal bus or the like, and are configured to be capable of communicating with each other.

Note that the configuration illustrated in FIG. 22 is not to limit the hardware configuration of the exchange server 10. The exchange server 10 may include hardware not illustrated, or need not include the input/output interface 313 as necessary. The number of processors 311 and the like included in the exchange server 10 is not to be limited to the example illustrated in FIG. 22, and for example, a plurality of processors 311 may be included in the exchange server 10.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC) or the like.

The function of the exchange server 10 is implemented by various processing modules. The processing modules are, for example, implemented by the processor 311 executing a program stored in the memory 312. The program can be recorded in a computer readable storage medium. The storage medium can be a non-transient (non-transitory) storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the management server 20, the terminal 30, the Financial Services Agency server 40, and the like can also be configured with an information processing apparatus similarly to the exchange server 10, and basic hardware configurations thereof do not have difference from that of the exchange server 10, and description thereof will thus be omitted.

[Example Alterations]

Note that the configuration, the operation, and the like of the cryptocurrency system described in the example embodiments are merely examples, and are not to limit the configuration and the like of the system. For example, the exchange server 10 may have a function of the management server 20.

The example embodiments mainly describe a case in which a plurality of account public keys are used. However, one account public key may be used. Alternatively, the terminal 30 may generate a new account public key for every trading, and use the new account public key as the remittance source address. Alternatively, the terminal 30 may separately use the account public key properly depending on the purpose of remittance.

The user may open an account in different exchange servers 10. For example, in the examples of FIG. 2 and FIG. 10, the user may open an account in each of the exchange servers 10-1 and 10-2.

In the example, an operator (staff member) of the exchange performs identity verification of the user. However, identity verification of the user may be performed using artificial intelligence (AI) or the like.

In the example embodiment, the management server 20 discards an unauthorized transaction. However, the unauthorized transaction may be provided for the Financial Services Agency (Financial Services Agency server 40) or the like. Alternatively, when the management server 20 consecutively receives unauthorized transactions from the same terminal 30, the management server 20 may notify the Financial Services Agency of such reception. Alternatively, the management server 20 may record in the blockchain specifying that it is an unauthorized transaction. In response to such as action of the management server 20, the Financial Services Agency may initiate investigation.

Alternatively, when the management server 20 receives an unauthorized transaction, the management server 20 may notify the terminal 30 that has transmitted the unauthorized transaction of such reception. The terminal 30 that has received the notification may generate an authorized transaction, or may stop the trading.

Alternatively, the management server 20 may change operation depending on a type of signature failed in verification. For example, when verification of a signature for the trading content fails, the management server 20 discards a transaction to which the signature is added. In contrast, when verification of a group signature for the account public key of a transmission source fails, the management server 20 reports such failure to the Financial Services Agency or the like. Alternatively, when a group signature of the remittance destination is invalid and a group signature of the remittance source is valid, the management server 20 may notify the terminal 30 of the situation. The terminal 30 that has received the notification can be informed of the fact that the terminal 30 is about to remit to an unauthorized user, which can reduce the probability that the user is involved in a fraud or the like.

Each of the example embodiments described above can be combined with each other as appropriate. For example, the first example embodiment and the fourth example embodiment can be combined with each other. In this case, it is only necessary that the terminal 30 acquire a signature performed by the exchange server 10 for the user public key of the remittance destination from the remittance destination.

In a plurality of sequence diagrams used in the description above, a plurality of processes (processing) are described in order; however, the order of execution of the processes executed in each example embodiment is not limited to the described order. In each example embodiment, the illustrated order of processes can be changed as far as there is no problem with regard to its contents, such as a change in which respective processes are executed in parallel, for example.

The whole or part of the example embodiments disclosed above can be described as in the following supplementary notes, but are not limited to the following.

(Supplementary Note 1)

A cryptocurrency system including:

at least one terminal (30, 100); and a plurality of management servers (20, 101) configured to manage a blockchain storing a trading history in a cryptocurrency, wherein the at least one terminal (30, 100) includes:

a trading control section (111, 304) configured to generate a transaction including a first signature for a trading content and a second signature enabling to verify a validity of a remittance source address described in the trading content, and a transmission section (112, 301) configured to transmit the generated transaction to the plurality of management servers (20, 101).

(Supplementary Note 2)

The cryptocurrency system according to supplementary note 1, wherein the at least one terminal (30, 100) further includes a key generation section (302) configured to generate a key pair of at least one first public key (account public key) and a first private key (account private key), and the trading control section (111, 304) is configured to generate the first signature by using the first private key, and generates, as the second signature, a group signature proving that the terminal (30, 100) including the trading control section is a member of an authorized institution (10, 40) having authority to open an account.
(Supplementary Note 3)
The cryptocurrency system according to supplementary note 2, wherein
the trading control section (111, 304) is configured to set the remittance source address, based on the first public key, and generate the group signature for the first public key as the second signature.
(Supplementary Note 4)
The cryptocurrency system according to supplementary note 3, wherein
each of the plurality of management servers (20, 101) is configured to write the transmitted transaction in the blockchain when verification of the first and second signatures is successful.
(Supplementary Note 5)
The cryptocurrency system according to supplementary note 4, wherein
the key generation section (302) is configured to generate a key pair of a second public key (user public key) and a second private key (user private key),
the second public key is provided for the authorized institution (10, 40), and
the authorized institution (10, 40) uses the second public key to generate a member certificate necessary for generation of the group signature in cooperation with the at least one terminal (30, 100).
(Supplementary Note 6)
The cryptocurrency system according to supplementary note 5, further including:
at least one first server (10) configured to open an account of the at least one terminal (30, 100); and
at least one second server (40) managed by an official institution configured to approve opening of the account by the at least one first server (10),
wherein the at least one first server (10) is configured to release a manager public key necessary for generation of the member certificate to public,
the at least one second server (40) is configured to release a privileged-entity public key necessary for generation of the group signature to public, and
the trading control section (111, 304) is configured to generate the group signature for the first public key by using the member certificate, the privileged-entity public key released to the public, and the second private key.
(Supplementary Note 7)
The cryptocurrency system according to supplementary note 6, wherein
the at least one second server (40) is configured to identify the second public key generated by a terminal (30, 100) of a remittance source from the group signature included in the transaction by using a privileged-entity private key corresponding to the privileged-entity public key.
(Supplementary Note 8)
The cryptocurrency system according to supplementary note 6 or 7, further including:
a plurality of the second servers (40),
wherein each of the plurality of management (20, 101) is configured to server performs verification of the group signature included in the transmitted transaction by using the privileged-entity public key released to the public by any one (40) of the plurality of second servers (40).
(Supplementary Note 9)
The cryptocurrency system according to supplementary note 8, wherein
the privileged-entity public key released to the public by each of the plurality of second servers (40) is described in the blockchain, and
each of the plurality of management servers (20, 101) is configured to perform verification of the group signature by using the privileged-entity public key described in the blockchain.
(Supplementary Note 10)
The cryptocurrency system according to any one of supplementary notes 7 to 9, wherein
the at least one second server (40) is configured to transmit the second public key identified from the group signature to the plurality of management servers (20, 101) to thereby write the second public key in the blockchain, and
in response to the second public key being written in the blockchain, the first server (10) is configured to transmit personal information corresponding to the second public key written in the blockchain to the second server (40) having written the second public key in the blockchain.
(Supplementary Note 11)
The cryptocurrency system according to supplementary note 10, wherein
the at least one second server (40) is configured to encrypt the second public key identified from the group signature by using a public key of the first server (10) storing the personal information corresponding to the second public key written in the blockchain.
(Supplementary Note 12)
The cryptocurrency system according to any one of supplementary notes 1 to 11, wherein
the trading control section (111, 304) is configured to acquire the group signature for a remittance destination address described in the trading content from a remittance destination, and generate the transaction including the first signature, the second signature, and the acquired group signature.
(Supplementary Note 13)
The cryptocurrency system according to supplementary note 5, further including:
at least one second server (40) configured to open an account of the at least one terminal (30, 100),
wherein the at least one second server (40) is configured to release a manager public key necessary for generation of the member certificate to public, and release a privileged-entity public key necessary for generation of the group signature to public, and
the trading control section (111, 304) is configured to generate the group signature for the first public key by using the member certificate, the privileged-entity public key released to the public, and the second private key.
(Supplementary Note 14)
The cryptocurrency system according to supplementary note 1, further including:
at least one first server (10) configured to open an account for the at least one terminal (30, 100) to use the cryptocurrency,
wherein the at least one first server (10) is configured to transmit, to the terminal (30, 100) opening the account, a signature for the remittance source address of the terminal (30, 100) opening the account, and
the terminal (30, 100) having received the transmitted signature is configured to add the transmitted signature to the transaction as the second signature.

(Supplementary Note 15)
The cryptocurrency system according to supplementary note 14, wherein
the at least one first server (10) is configured to perform a signature for a public key generated by the terminal (30, 100) opening the account.
(Supplementary Note 16)
A terminal (30, 100) including:
a trading control section (111, 304) configured to generate a transaction including a first signature for a trading content in a cryptocurrency and a second signature enabling to verify a validity of a remittance source address described in the trading content; and
a transmission section (112, 301) configured to transmit the generated transaction to a plurality of management servers (20, 101) configured to manage a blockchain storing a trading history in the cryptocurrency.
(Supplementary Note 17)
A server (10) configured to provide a terminal (30, 100) configured to perform trading by using a cryptocurrency with information for generating a signature enabling to verify a validity of a remittance source address described in a trading content by the terminal (30, 100).
(Supplementary Note 18)
A server (20, 101) configured to
manage a blockchain storing a trading history in a cryptocurrency,
receive a transaction including a first signature for a trading content and a second signature enabling to verify a validity of a remittance source address described in the trading content, and
accept the received transaction when verification of the first and second signatures is successful.
(Supplementary Note 19)
A trading method of a cryptocurrency, the trading method including:
generating a transaction including a first signature for a trading content in the cryptocurrency and a second signature enabling to verify a validity of a remittance source address described in the trading content; and
transmitting the generated transaction to a plurality of management servers (20, 101) configured to manage a blockchain storing a trading history in the cryptocurrency.
(Supplementary Note 20)
A program causing a computer (311) installed in a terminal (30, 100) to execute:
processing of generating a transaction including a first signature for a trading content in a cryptocurrency and a second signature enabling to verify a validity of a remittance source address described in the trading content; and
processing of transmitting the generated transaction to a plurality of management servers (20, 101) configured to manage a blockchain storing a trading history in the cryptocurrency.
Each of the configurations of supplementary notes 16 to 20 can be developed into any one of the configurations of supplementary notes 2 to 15 in the same way as in the case of supplementary note 1.
Note that each disclosure of the cited related art documents is incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10, 10-1, 10-2, 10-11, 10-12 Exchange Server
20, 20-1, 20-2, 101 Management Server
30, 30-1, 30-2, 100 Terminal
40, 40-1, 40-2 Financial Services Agency server
111, 304 Trading control section
112 Communication Section
201, 301, 401, 501 Communication Control Section
202, 302, 502 Key Generation Section
203, 505 Account Management Section
204 Signature Generation Section
205, 305, 403, 504 Storage Section
206, 506 Certificate Generation Section
303 Account Opening Section
306 Certificate Acquisition Section
311 Processor
312 Memory
313 Input/Output Interface
314 Communication Interface
402 Ledger Management Section
411 Transaction Verification Section
412 Block Generation Section
413 Block Verification Section
503 Transactor Identification Section

What is claimed is:

1. A cryptocurrency system comprising:
at least one terminal; and
a plurality of management servers configured to manage a blockchain storing a trading history in a cryptocurrency,
wherein the at least one terminal comprises:
a memory storing instructions; and
one or more processors configured to execute the instructions to:
generate a transaction including a first signature for a trading content and a second signature enabling to verify a validity of a remittance source address described in the trading content, and
transmit the generated transaction to the plurality of management servers.

2. The cryptocurrency system according to claim 1, wherein
the one or more processors are further configured to
generate a key pair of at least one first public key (account public key) and a first private key (account private key), and
generate the first signature by using the first private key, and generates, as the second signature, a group signature proving that the terminal including the one or more processors is a member of an authorized institution having authority to open an account.

3. The cryptocurrency system according to claim 2, wherein
the one or more processors are further configured to set the remittance source address, based on the first public key, and generate the group signature for the first public key as the second signature.

4. The cryptocurrency system according to claim 3, wherein
each of the plurality of management servers is configured to write the transmitted transaction in the blockchain when verification of the first and second signatures is successful.

5. The cryptocurrency system according to claim 4, wherein
the one or more processors are further configured to generate a key pair of a second public key (user public key) and a second private key (user private key),
the second public key is provided for the authorized institution, and
the authorized institution uses the second public key to generate a member certificate necessary for generation of the group signature in cooperation with the at least one terminal.

6. The cryptocurrency system according to claim 5, further comprising:
at least one first server configured to open an account of the at least one terminal; and
at least one second server managed by an official institution configured to approve opening of the account by the at least one first server,
wherein the at least one first server is configured to release a manager public key necessary for generation of the member certificate to public,
the at least one second server is configured to release a privileged-entity public key necessary for generation of the group signature to public, and
the one or more processors are further configured to generate the group signature for the first public key by using the member certificate, the privileged-entity public key released to the public, and the second private key.

7. The cryptocurrency system according to claim 6, wherein
the at least one second server is configured to identify the second public key generated by a terminal of a remittance source from the group signature included in the transaction by using a privileged-entity private key corresponding to the privileged-entity public key.

8. The cryptocurrency system according to claim 6, further comprising:
a plurality of the second servers,
wherein each of the plurality of management is configured to server performs verification of the group signature included in the transmitted transaction by using the privileged-entity public key released to the public by any one of the plurality of second servers.

9. The cryptocurrency system according to claim 8, wherein
the privileged-entity public key released to the public by each of the plurality of second servers is described in the blockchain, and
each of the plurality of management servers is configured to perform verification of the group signature by using the privileged-entity public key described in the blockchain.

10. The cryptocurrency system according to claim 7, wherein
the at least one second server is configured to transmit the second public key identified from the group signature to the plurality of management servers to thereby write the second public key in the blockchain, and
in response to the second public key being written in the blockchain, the first server is configured to transmit personal information corresponding to the second public key written in the blockchain to the second server having written the second public key in the blockchain.

11. The cryptocurrency system according to claim 10, wherein
the at least one second server is configured to encrypt the second public key identified from the group signature by using a public key of the first server storing the personal information corresponding to the second public key written in the blockchain.

12. The cryptocurrency system according to claim 1, wherein
the one or more processors are further configured to acquire the group signature for a remittance destination address described in the trading content from a remittance destination, and generate the transaction including the first signature, the second signature, and the acquired group signature.

13. The cryptocurrency system according to claim 5, further comprising:
at least one second server configured to open an account of the at least one terminal,
wherein the at least one second server is configured to release a manager public key necessary for generation of the member certificate to public, and release a privileged-entity public key necessary for generation of the group signature to public, and
the one or more processors are further configured to generate the group signature for the first public key by using the member certificate, the privileged-entity public key released to the public, and the second private key.

14. The cryptocurrency system according to claim 1, further comprising:
at least one first server configured to open an account for the at least one terminal to use the cryptocurrency,
wherein the at least one first server is configured to transmit, to the terminal opening the account, a signature for the remittance source address of the terminal opening the account, and
the terminal having received the transmitted signature is configured to add the transmitted signature to the transaction as the second signature.

15. The cryptocurrency system according to claim 14, wherein
the at least one first server is configured to perform a signature for a public key generated by the terminal opening the account.

16. A terminal comprising:
a memory storing instructions; and
one or more processors configured to execute the instructions to:
generate a transaction including a first signature for a trading content in a cryptocurrency and a second signature enabling to verify a validity of a remittance source address described in the trading content; and
transmit the generated transaction to a plurality of management servers configured to manage a blockchain storing a trading history in the cryptocurrency.

17. A server comprising:
a memory storing instructions; and
one or more processors configured to execute the instructions to provide a terminal configured to perform trading by using a cryptocurrency with information for generating a signature enabling to verify a validity of a remittance source address described in a trading content by the terminal.

18. A server configured to comprising:
a memory storing instructions; and
one or more processors configured to execute the instructions to manage a blockchain storing a trading history in a cryptocurrency, receive a transaction including a first signature for a trading content and a second signature enabling to verify a validity of a remittance source address described in the trading content, and accept the received transaction when verification of the first and second signatures is successful.

19. A trading method of a cryptocurrency, the trading method comprising:

generating a transaction including a first signature for a trading content in the cryptocurrency and a second signature enabling to verify a validity of a remittance source address described in the trading content; and transmitting the generated transaction to a plurality of management servers configured to manage a blockchain storing a trading history in the cryptocurrency.

\* \* \* \* \*